(12) United States Patent
Lane et al.

(10) Patent No.: US 11,501,372 B2
(45) Date of Patent: *Nov. 15, 2022

(54) VISUAL DEPICTION OF WARNINGS AND ERRORS

(71) Applicant: TRADING TECHNOLOGIES INTERNATIONAL INC., Chicago, IL (US)

(72) Inventors: Richard Lane, Chicago, IL (US); Gregory DeArment, New York, NY (US)

(73) Assignee: Trading Technologies International, Inc., Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/985,706

(22) Filed: Aug. 5, 2020

(65) Prior Publication Data
US 2020/0364792 A1 Nov. 19, 2020

Related U.S. Application Data

(63) Continuation of application No. 15/989,851, filed on May 25, 2018, now Pat. No. 10,789,646, which is a
(Continued)

(51) Int. Cl.
*G06Q 40/00* (2012.01)
*G06Q 40/06* (2012.01)
(Continued)

(52) U.S. Cl.
CPC .................................. *G06Q 40/04* (2013.01)

(58) Field of Classification Search
CPC ........ G06Q 40/04; G06Q 40/00; G06Q 40/06; G06Q 10/10
(Continued)

(56) References Cited

U.S. PATENT DOCUMENTS 7,680,721 B2 * 3/2010 Cutler .................... G06Q 40/00 705/37
7,702,569 B1 * 4/2010 Tanpoco ................ G06Q 40/04 705/37

(Continued)

OTHER PUBLICATIONS

Google NPL (non-patent literature) Search, dated Jan. 13, 2022. (Year: 2022).*
(Continued)

*Primary Examiner* — Hai Tran
(74) *Attorney, Agent, or Firm* — McDonnell Boehnen Hulbert & Berghoff LLP

(57) ABSTRACT

Methods, systems and computer-readable storage media disclosed herein provide visual depictions of warnings and errors. An example method includes detecting, using a computing device, a change in a design of a trading algorithm. The trading algorithm is defined by a user-specified arrangement of blocks representing trading functionality. The example method includes determining, using the computing device, whether the trading algorithm complies with a trading algorithm rule. The example method includes facilitating, using the computing device, at least one of warning handling or error handling when the trading algorithm does not comply with the trading algorithm rule. Facilitating warning handling or error handling includes displaying a warning or an error to the user in connection with the trading algorithm before the trading algorithm is available for execution.

18 Claims, 14 Drawing Sheets

Related U.S. Application Data continuation of application No. 13/655,926, filed on Oct. 19, 2012, now Pat. No. 10,007,949.

(51) Int. Cl.
*G06Q 20/10* (2012.01)
*G06Q 40/04* (2012.01)

(58) Field of Classification Search
USPC ...................................... 705/35–45
See application file for complete search history.

(56) References Cited

U.S. PATENT DOCUMENTS

| | | | |
|---|---|---|---|
| 7,882,014 B2* | 2/2011 | Shapiro | G06Q 40/04 705/37 |
| 8,156,036 B1* | 4/2012 | Waelbroeck | G06Q 40/025 705/37 |
| 8,442,885 B1 | 5/2013 | Carrie et al. | |
| 10,007,949 B2 | 6/2018 | Lane et al. | |
| 2006/0129475 A1 | 6/2006 | Badenhorst et al. | |
| 2011/0093378 A1 | 4/2011 | Lane et al. | |
| 2011/0093379 A1* | 4/2011 | Lane | G06Q 40/04 705/37 |
| 2012/0233054 A1* | 9/2012 | O'Connor | G06Q 40/04 705/37 |
| 2018/0276752 A1 | 9/2018 | Lane et al. | |

OTHER PUBLICATIONS

Google Scholar Search, dated Jan. 13, 2022. (Year: 2022).*
Dialog Search Results, dated Jun. 17, 2022. (Year: 2022).*
International Search Report of International Application No. PCT/US2013/035641 dated May 15, 2013 (mailed Jun. 3, 2013).

* cited by examiner

VISUAL DEPICTION OF WARNINGS AND ERRORS

CROSS REFERENCE TO RELATED APPLICATIONS

This application is a continuation of U.S. patent application Ser. No. 15/989,851, filed May 25, 2018, now U.S. Pat. No. 10,789,646, which is a continuation of U.S. patent application Ser. No. 13/655,926, filed Oct. 19, 2012, now U.S. Pat. No. 10,007,949, each of which is herein incorporated herein by reference in its entirety for all purposes.

BACKGROUND

An electronic trading system generally includes a trading device in communication with an electronic exchange. The electronic exchange sends information about a market, such as prices and quantities, to the trading device. The trading device sends messages, such as messages related to orders, to the electronic exchange. The electronic exchange attempts to match quantity of an order with quantity of one or more contra-side orders.

In some electronic trading systems, the trading device receives and processes market data without displaying the market data on a display device. For example, a "black box" algorithmic trading system may run automatically and without displaying market data. However, in other electronic trading systems, the trading device displays processed market data on a display device. The trading device may include software that creates a trading interface. In general, a trading interface is a tool that enables a user to interact and exchange information with the electronic exchange. For example, a trading interface may enable a user to view market data, submit a trade order to the electronic exchange, obtain a market quote, monitor a position, and/or combinations thereof.

BRIEF DESCRIPTION OF THE DRAWINGS

Certain embodiments are disclosed with reference to the following drawings.

Figure 1:
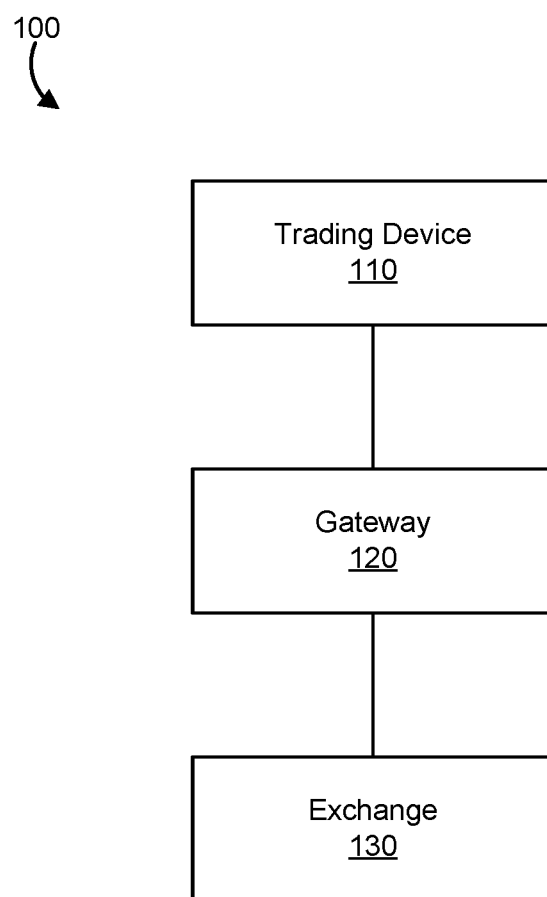
FIG. 1 illustrates a block diagram of an example electronic trading system in which certain embodiments may be employed.

Certain embodiments will be better understood when read in conjunction with the provided drawings, which illustrate examples. It should be understood, however, that the embodiments are not limited to the arrangements and instrumentality shown in the attached drawings.

DESCRIPTION

I. Brief Description of Certain Embodiments

Embodiments disclosed herein provide systems, methods, and computer-readable media to detect problems within a trading algorithm and to visually identify these problems in a trading interface to assist a user in the evaluation and/or correction of the detected problems. The trading interface as used herein includes the processes and programs to interact with an exchange, create trading strategies, and analyze information. In certain examples, the trading interface may include one or more blocks or objects that can be configured and arranged to define a trading algorithm. For example, the trading interface may include a design canvas area configured to allow a user to visually define a trading algorithm by selecting various algorithm blocks and connecting the inputs and outputs of those blocks to create a trading algorithm that may be implemented to execute trades at an exchange. Often times, such visually designed trading algorithms may be extensive and complex making it difficult for a user to detect the presence of problems and/or errors. Problems and/or errors within a trading algorithm may be, for example, logic-based (e.g., an infinite loop) or trading-based (e.g., connecting a particular input to a particular output may result in an unintended trade).

Certain embodiments disclosed herein provide a verification tool to continually analyze trading algorithms according to rules designed to detect various logic-based and trading-based problems and/or errors that may exist within trading algorithms. In certain embodiments, when a user makes a change to a trading algorithm (e.g., selecting a new algorithm block and connecting it to other algorithm bocks), the verification tool checks the trading algorithm blocks and/or their associated connections with other trading algorithm blocks against the rules to detect any problems and/or errors within the trading algorithm.

In certain embodiments, the verification tool, upon detection of a violation of one or more rules may generate an error to be displayed to a user via the trading interface. In such an embodiment, the error may include a visual depiction of the error (e.g., the algorithm blocks and/or connections in violation of a rule may be highlighted), text related to the error (e.g., an explanation of the violation, a suggestion to remedy the violation, etc.), or other information related to the error. In certain embodiments, providing an error to a user prevents the trading algorithm from being executed (e.g., the trading algorithm may not be implemented to execute a trade at an exchange).

In certain embodiments, upon detection of a violation of one or more rules by the verification tool, the trading interface may display a warning on the design canvas that indicates existence of a problem associated with a trading algorithm block and/or connection. In such an embodiment, the displayed warning may include a visual depiction of the source of the warning (e.g., the algorithm blocks and/or connections in violation of a rule may be highlighted), text related to the warning (e.g., an explanation of the violation, a suggestion to remedy the violation, etc.), or other information related to the warning. In certain embodiments, providing a warning to a user does not prevent the trading algorithm from being executed (e.g., the trading algorithm may be implemented to execute a trade at an exchange).

In certain embodiments, a warning may be ignored by a user (e.g., the user may select an ignore button that removes the warning from display). In certain embodiments, a log of ignored warnings is kept such that an ignored warning is not displayed again. In certain embodiments, if a warning is remedied by a user (e.g., the user alters the trading algorithm such that the trading algorithm complies with the rules), the warning is removed from the ignored warnings log.

Although the description discloses embodiments including, among other components, software executed on hardware, it should be noted that the embodiments are merely illustrative and should not be considered as limiting. For example, it is contemplated that any or all of these hardware and software components may be embodied exclusively in hardware, exclusively in software, exclusively in firmware, or in any combination of hardware, software, and/or firmware. Accordingly, certain embodiments may be implemented in other ways.

Certain embodiments provide methods, systems and computer-readable storage media to provide visual depictions of warnings and errors.

Certain embodiments provide a method including detecting, using a computing device, a change in a design of a trading algorithm. The trading algorithm is defined by a user-specified arrangement of blocks representing trading functionality. The example method includes determining, using the computing device, whether the trading algorithm complies with a trading algorithm rule. The example method includes facilitating, using the computing device, at least one of warning handling or error handling when the trading algorithm does not comply with the trading algorithm rule. Facilitating warning handling or error handling includes displaying a warning or an error to the user in connection with the trading algorithm before the trading algorithm is available for execution.

Certain embodiments provide a system including a change detector to detect a change in a design of a trading algorithm. The trading algorithm is defined by a user-specified arrangement of blocks representing trading functionality. The example system includes a rules applier to determine whether the trading algorithm complies with a trading algorithm rule. The example system includes a facilitator to facilitate at least one of warning handling or error handling when the trading algorithm does not comply with the trading algorithm rule. Facilitating warning handling or error handling includes displaying a warning or an error to the user in connection with the trading algorithm before the trading algorithm is available for execution.

Certain embodiments provide a tangible computer-readable storage medium including instructions that, when executed, cause a computing device to at least detect a change in a design of a trading algorithm. The trading algorithm is defined by a user-specified arrangement of blocks representing trading functionality. The example computer-readable medium includes instructions that, when executed, cause the computing device to determine whether the trading algorithm complies with a trading algorithm rule. The example computer-readable medium includes instructions that, when executed, cause the computing device to facilitate at least one of warning handling or error handling when the trading algorithm does not comply with the trading algorithm rule. Facilitating warning handling or error handling includes displaying a warning or an error to the user in connection with the trading algorithm before the trading algorithm is available for execution.

II. Example Electronic Trading System

FIG. 1 illustrates a block diagram representative of an exemplary electronic trading system 100 in which certain embodiments may be employed. The system 100 includes a trading device 110, a gateway 120, and an exchange 130. The trading device 110 is in communication with the gateway 120. The gateway 120 is in communication with the exchange 130. As used herein, the phrase "in communication" encompasses direct communication and/or indirect communication through one or more intermediary components. The exemplary electronic trading system 100 depicted in FIG. 1 may be in communication with additional components, subsystems, and elements to provide additional functionality and capabilities without departing from the teaching and disclosure provided herein.

In operation, the trading device 110 may receive market data from the exchange 130 through the gateway 120. A user may utilize the trading device 110 to monitor this market data and/or base a decision to send an order message to buy or sell one or more tradable objects to the exchange 130.

Market data may include data about a market for a tradable object. For example, market data may include the inside market, market depth, last traded price ("LTP"), a last traded quantity ("LTQ"), or a combination thereof. The inside market is the lowest available ask price (best offer) and the highest available bid price (best bid) in the market for a particular tradable object at a particular point in time (since the inside market may vary over time). Market depth refers to quantities available at the inside market and at other prices away from the inside market. Due to the quantity available, there may be "gaps" in market depth.

A tradable object is anything which may be traded. For example, a certain quantity of the tradable object may be bought or sold for a particular price. A tradable object may include financial products, stocks, options, bonds, future contracts, currency, warrants, funds derivatives, securities, commodities, swaps, interest rate products, index-based products, traded events, goods, or a combination thereof. A tradable object may include a product listed and/or administered by an exchange (for example, the exchange 130), a product defined by the user, a combination of real or synthetic products, or a combination thereof. There may be a synthetic tradable object that corresponds and/or is similar to a real tradable object.

An order message is a message that includes a trade order. A trade order may be, for example, a command to place an order to buy or sell a tradable object, a command to initiate managing orders according to a defined trading strategy, a command to change or cancel a previously submitted order (for example, modify a working order), an instruction to an electronic exchange relating to an order, or a combination thereof.

The trading device 110 may include one or more electronic computing platforms. For example, the trading device 110 may include a desktop computer, hand-held device, laptop, server, a portable computing device, a trading terminal, an embedded trading system, a workstation, an algorithmic trading system such as a "black box" or "grey box" system, cluster of computers, or any combination thereof. As another example, the trading device 110 may include a single or multi-core processor in communication with a memory or other storage medium configured to accessibly store one or more computer programs, applications, libraries, computer readable instructions, and the like, for execution by the processor.

As used herein, the phrases "configured to" and "adapted to" encompass that an element, structure, or device has been modified, arranged, changed, or varied to perform a specific function or for a specific purpose.

By way of example, the trading device 110 may be implemented as a personal computer running a copy of X_TRADER®, an electronic trading platform provided by Trading Technologies International, Inc. of Chicago, Ill. (hereinafter referred to as "Trading Technologies". As another example, the trading device 110 may be a server running a trading application providing automated trading tools such as ADL™, AUTOSPREADER®, and/or AUTO-TRADER™, also provided by Trading Technologies. In yet another example, the trading device 110 may include a trading terminal in communication with a server, where collectively the trading terminal and the server are the trading device 110.

The trading device 110 is generally owned, operated, controlled, programmed, configured, or otherwise used by a user. As used herein, the phrase "user" may include, but is not limited to, a human (for example, a trader), trading group (for example, group of traders), or an electronic trading device (for example, an algorithmic trading system). One or more users may be involved in the ownership, operation, control, programming, configuration, or other use, for example.

The trading device 110 may include one or more trading applications. As used herein, a trading application is an application that facilitates or improves electronic trading. A trading application provides one or more electronic trading tools. For example, a trading application stored by a trading device may be executed to arrange and display market data in one or more trading windows. In another example, a trading application may include an automated spread trading application providing spread trading tools. In yet another example, a trading application may include an algorithmic trading application that automatically processes an algorithm and performs certain actions, such as placing an order, modifying an existing order, deleting an order. In yet another example, a trading application may provide one or more trading screens. A trading screen may provide one or more trading tools that allow interaction with one or more markets. For example, a trading tool may allow a user to obtain and view market data, set order entry parameters, submit order messages to an exchange, deploy trading algorithms, and/or monitor positions while implementing various trading strategies. The electronic trading tools provided by the trading application may always be available or may be available only in certain configurations or operating modes of the trading application.

A trading application may include computer readable instructions that are stored in a computer readable medium and executable by a processor. A computer readable medium may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable storage media and to exclude propagating signals.

One or more components or modules of a trading application may be loaded into the computer readable medium of the trading device 110 from another computer readable medium. For example, the trading application (or updates to the trading application) may be stored by a manufacturer, developer, or publisher on one or more CDs or DVDs, which are then loaded onto the trading device 110 or to a server from which the trading device 110 retrieves the trading application. As another example, the trading device 110 may receive the trading application (or updates to the trading application) from a server, for example, via the Internet or an internal network. The trading device 110 may receive the trading application or updates when requested by the trading device 110 (for example, "pull distribution") and/or un-requested by the trading device 110 (for example, "push distribution").

The trading device 110 may be adapted to send order messages. For example, the order messages may be sent to through the gateway 120 to the exchange 130. As another example, the trading device 110 may be adapted to send order messages to a simulated exchange in a simulation environment which does not effectuate real-world trades.

The order messages may be sent at the request of a user. For example, a trader may utilize the trading device 110 to send an order message or manually input one or more parameters for a trade order (for example, an order price and/or quantity). As another example, an automated trading tool provided by a trading application may calculate one or more parameters for a trade order and automatically send the order message. In some instances, an automated trading tool may prepare the order message to be sent but not actually send it without confirmation from a user.

An order message may be sent in one or more data packets or through a shared memory system. For example, an order message may be sent from the trading device 110 to the exchange 130 through the gateway 120. The trading device 110 may communicate with the gateway 120 using a local area network, a wide area network, a wireless network, a virtual private network, a T1 line, a T3 line, an integrated services digital network ("ISDN") line, a point-of-presence, the Internet, and/or a shared memory system, for example.

The gateway 120 may include one or more electronic computing platforms. For example, the gateway 120 may implemented as one or more desktop computer, hand-held device, laptop, server, a portable computing device, a trading terminal, an embedded trading system, workstation with a single or multi-core processor, an algorithmic trading system such as a "black box" or "grey box" system, cluster of computers, or any combination thereof.

The gateway 120 may facilitate communication. For example, the gateway 120 may perform protocol translation for data communicated between the trading device 110 and the exchange 130. The gateway 120 may process an order message received from the trading device 110 into a data format understood by the exchange 130, for example. Similarly, the gateway 120 may transform market data in an exchange-specific format received from the exchange 130 into a format understood by the trading device 110, for example.

The gateway 120 may include a trading application, similar to the trading applications discussed above, that facilitates or improves electronic trading. For example, the gateway 120 may include a trading application that tracks orders from the trading device 110 and updates the status of the order based on fill confirmations received from the exchange 130. As another example, the gateway 120 may include a trading application that coalesces market data from the exchange 130 and provides it to the trading device 110. In yet another example, the gateway 120 may include a trading application that provides risk processing, calculates implieds, handles order processing, handles market data processing, or a combination thereof.

In certain embodiments, the gateway 120 communicates with the exchange 130 using a local area network, a wide area network, a virtual private network, a T1 line, a T3 line, an ISDN line, a point-of-presence, the Internet, and/or a shared memory system, for example.

The exchange 130 may be owned, operated, controlled, or used by an exchange entity. Example exchange entities include the CME Group, the London International Financial Futures and Options Exchange, the IntercontinentalExchange, and Eurex. The exchange 130 may include an electronic matching system, such as a computer, server, or other computing device, which is adapted to allow tradable objects, for example, offered for trading by the exchange, to be bought and sold. The exchange 130 may include separate entities, some of which list and/or administer tradable objects and others which receive and match orders, for example. The exchange 130 may include an electronic communication network ("ECN"), for example.

The exchange 130 may be an electronic exchange. The exchange 130 is adapted to receive order messages and match contra-side trade orders to buy and sell tradable objects. Unmatched trade orders may be listed for trading by the exchange 130. The trade orders may include trade orders received from the trading device 110 or other devices in communication with the exchange 130, for example. For example, typically the exchange 130 will be in communication with a variety of other trading devices (which may be similar to trading device 110) which also provide trade orders to be matched.

The exchange 130 is adapted to provide market data. Market data may be provided in one or more messages or data packets or through a shared memory system. For example, the exchange 130 may publish a data feed to subscribing devices, such as the trading device 110 or gateway 120. The data feed may include market data.

The system 100 may include additional, different, or fewer components. For example, the system 100 may include multiple trading devices, gateways, and/or exchanges. In another example, the system 100 may include other communication devices, such as middleware, firewalls, hubs, switches, routers, servers, exchange-specific communication equipment, modems, security managers, and/or encryption/decryption devices.

III. Expanded Example Electronic Trading System

Figure 2:
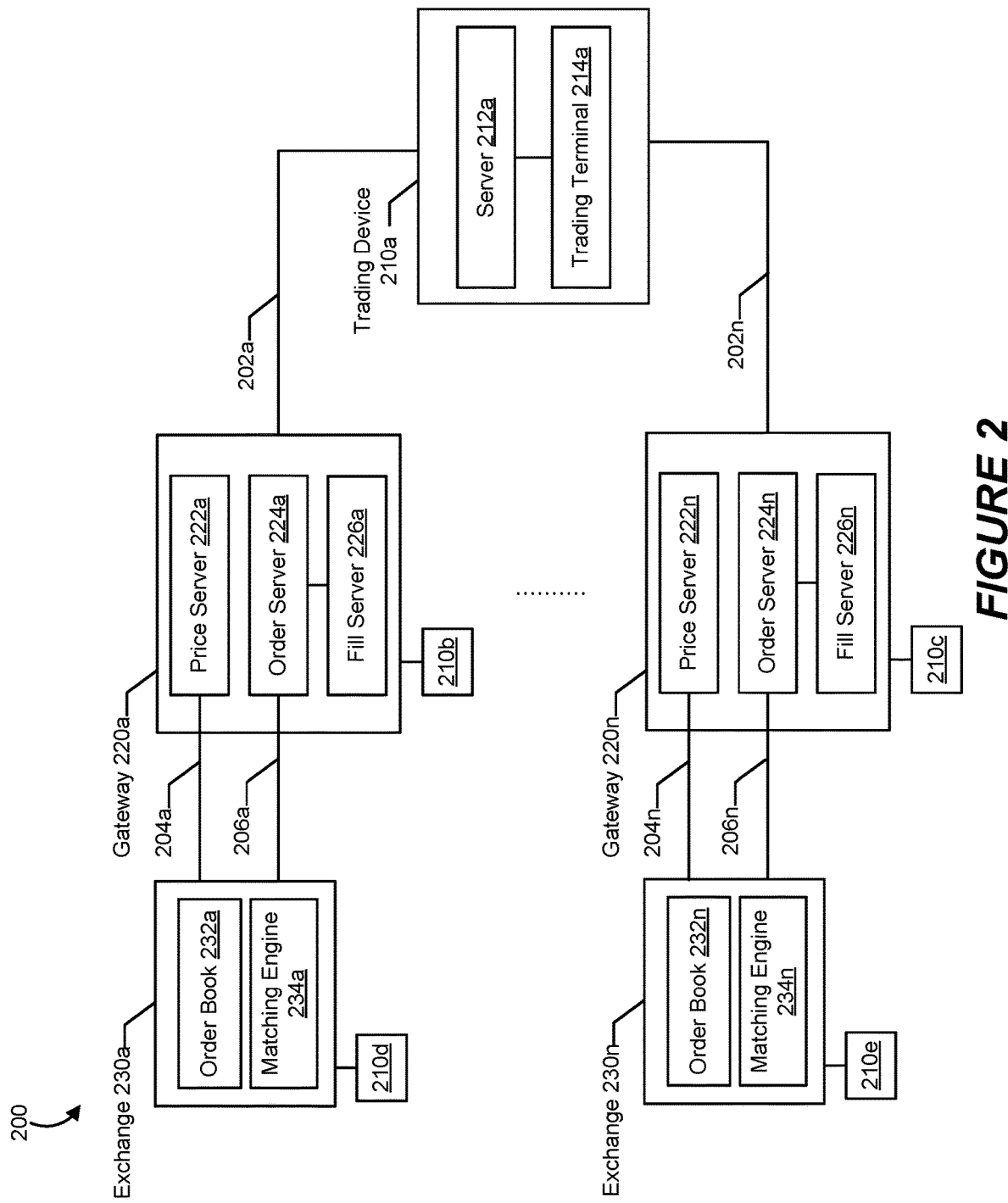
FIG. 2 illustrates a block diagram of another exemplary electronic trading system in which certain embodiments may be employed.

FIG. 2 illustrates a block diagram of another exemplary electronic trading system 200 in which certain embodiments may be employed. In this example, a trading device 210a is in communication with an exchange 230a through a gateway 220a. The following discussion mainly focuses on the trading device 210a, gateway 220a, and the exchange 230a. However, the trading device 210a may also be connected to and communicate with any number of gateways 220n connected to exchanges 230n. The communication between the trading device 110a and other exchanges 230n may be the same, similar, or different than the communication between the trading device 210a and exchange 230a. Generally, each exchange has its own preferred techniques and/or formats for communicating with a trading device, a gateway, the user, or another exchange.

The trading device 210a, which may be similar to the trading device 110 in FIG. 1, may include a server 212a in communication with a trading terminal 214a. The server 212a may be located geographically closer to the gateway 120 than the trading terminal 214a. As a result, the server 212a latency benefits that are not afforded to the trading terminal 214a. In operation, the trading terminal 214a may provide a trading screen to a user and communicate commands to the server 212a for further processing. For example, a trading algorithm may be deployed to the server 212a for execution based on market data. The server 212a may execute the trading algorithm without further input from the user. In another example, the server 212a may include a trading application providing automated trading tools and communicate back to the trading terminal 214a. The trading device 210a may include, additional, different, or fewer components.

The trading device 210a may communicate with the gateway 220a using one or more communication networks. As used herein, a communication network is any network, including the Internet, which facilitates or enables communication between, for example, the trading device 210a, the gateway 220a and the exchange 220a. For example, as shown in FIG. 2, the trading device 210a may communicate with the gateway 220a across a multicast communication network 202a. The data on the network 202a may be logically separated by subject (for example, prices, orders, or fills). As a result, the server 212a and trading terminal 214a can subscribe to and receive data (for example, data relating to prices, orders, or fills) depending on their individual needs.

The gateway 220a, which may be similar to the gateway 120 of FIG. 1, may include a price server 222a, order server 224a, and fill server 226a. The gateway 220a may include additional, different, or fewer components. The price server 222a may process price data. Price data includes data related to a market for one or more tradable objects. The order server 224a may process order data. Order data is data related to a user's trade orders. For example, order data may include order messages, confirmation messages, or other types of messages. The fill server collects and provides fill data. Fill data includes data relating to one or more fills of trade orders. For example, the fill server 226a may provide a record of trade orders, which have been routed through the order server 224a, that have and have not been filled. The servers 222a, 224a, 226a may run on the same machine or separate machines.

The gateway 220a may communicate with the exchange 230a using one or more communication networks. For example, as shown in FIG. 2, there may be two communication networks connecting the gateway 220a and the exchange 230a. The network 204a may be used to communicate market data to the price server 222a. In some instances, the exchange 230a may include this data in a data feed that is published to subscribing devices. The network 206a may be used to communicate order data.

The exchange 230a, which may be similar to the exchange 130 of FIG. 1, may include an order book 232a and a matching engine 234a. The exchange 230a may include additional, different, or fewer components. The order book 232a is a database that includes data relating to unmatched quantity of trade orders. For example, an order book may include data relating to a market for a tradable object, such as the inside market, market depth at various price levels, the last traded price, and the last traded quantity. The matching engine 234a may match contra-side bids and offers. For example, the matching engine 234a may execute one or more matching algorithms that match contra-side bids and offers. A sell order is contra-side to a buy order with the same price. Similarly, a buy order is contra-side to a sell order with the same price.

In operation, the exchange 230a may provide price data from the order book 232a to the price server 222a and order data and/or fill data from the matching engine 234a to the order server 224a. Servers 222a, 224a, 226a may translate and communicate this data back to the trading device 210a. The trading device 210a, for example, using a trading application, may process this data. For example, the data may be displayed to a user. In another example, the data may be utilized in a trading algorithm to determine whether a trade order should be submitted to the exchange 230a. The trading device 210a may prepare and send an order message to the exchange 230a.

In certain embodiments, the gateway 220a is part of the trading device 210a. For example, the components of the gateway 220a may be part of the same computing platform as the trading device 210a. As another example, the functionality of the gateway 220a may be performed by components of the trading device 210a. In certain embodiments, the gateway 220a is not present. Such an arrangement may occur when the trading device 210a does not need to utilize the gateway 220a to communicate with the exchange 230a, for example. For example, if the trading device 210a has been adapted to communicate directly with the exchange 230a.

Additional trading devices 210b-210e, which are similar to trading device 210a, may be connected to one or more of the gateways 220a-220n and exchanges 230a-230n. Furthermore, additional gateways, similar to the gateway 220a, may be in communication with multiple exchanges, similar to the exchange 230a. Each gateway may be in communication with one or more different exchanges, for example. Such an arrangement may, for example, allow one or more trading devices 210a to trade at more than one exchange (and/or provide redundant connections to multiple exchanges).

IV. Example Computing Device

Figure 3:
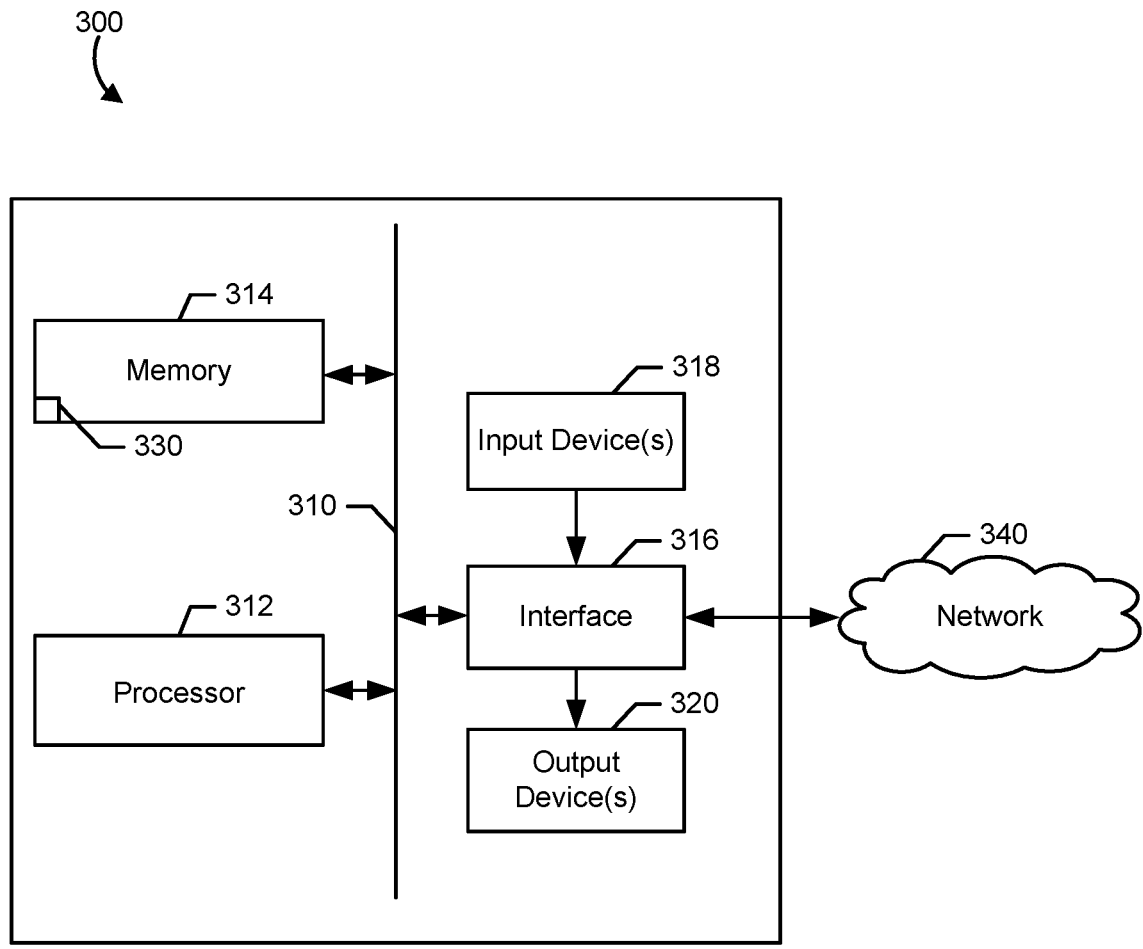
FIG. 3 illustrates a block diagram of an example computing device which may be used to implement certain embodiments.

FIG. 3 illustrates a block diagram of an example computing device 300 which may be used to implement the disclosed embodiments. The trading device 110 of FIG. 1 may include one or more computing devices 300, for example. The gateway 120 of FIG. 1 may include one or more computing devices 300, for example. The exchange 130 of FIG. 1 may include one or more computing devices 300, for example. The computing device 300 may include additional, different, or fewer components.

The computing device 300 includes a communication network 310, a processor 312, a memory 314, an interface 316, an input device 318, and an output device 320. The computing device 200 may include additional, different, or fewer components. For example, multiple communication networks, multiple processors, multiple memory, multiple interfaces, multiple input devices, multiple output devices, or any combination thereof, may be provided. As another example, the computing device 300 may not include an input device 318 or output device 320.

As shown in FIG. 3, the computing device 300 may include a processor 312 coupled to a communication network 310. The communication network 310 may include a communication bus, channel, network, circuit, switch, fabric, or other mechanism for communicating data between components in the computing device 300. The communication network 310 may be communicatively coupled with and transfer data between any of the components of the computing device 300.

The processor 312 may be any suitable processor, processing unit, or microprocessor. The processor 312 may include one or more general processors, digital signal processors, application specific integrated circuits, field programmable gate arrays, analog circuits, digital circuits, programmed processors, and/or combinations thereof, for example. The processor 312 may be a single device or a combination of devices, such as one or more devices associated with a network or distributed processing. Any processing strategy may be used, such as multi-processing, multi-tasking, parallel processing, and/or remote processing. Processing may be local or remote and may be moved from one processor to another processor. In certain embodiments, the computing device 300 is a multi-processor system and, thus, may include one or more additional processors which are communicatively coupled to the communication network 310.

The processor 312 may be operable to execute logic and other computer readable instructions encoded in one or more tangible media, such as the memory 314. As used herein, logic encoded in one or more tangible media includes instructions which may be executable by the processor 312 or a different processor. The logic may be stored as part of software, hardware, integrated circuits, firmware, and/or micro-code, for example. The logic may be received from an external communication device via a communication network such as the network 340. The processor 312 may execute the logic to perform the functions, acts, or tasks illustrated in the figures or described herein.

The memory 314 may be one or more tangible media, such as computer readable storage media, for example. Computer readable storage media may include various types of volatile and non-volatile storage media, including, for example, random access memory, read-only memory, programmable read-only memory, electrically programmable read-only memory, electrically erasable read-only memory, flash memory, any combination thereof, or any other tangible data storage device. As used herein, the term non-transitory or tangible computer readable medium is expressly defined to include any type of computer readable medium and to exclude propagating signals. The memory 314 may include any desired type of mass storage device including hard disk drives, optical media, magnetic tape or disk, etc.

The memory 314 may include one or more memory devices. For example, the memory 314 may include local memory, a mass storage device, volatile memory, non-volatile memory, or a combination thereof. The memory 314 may be adjacent to, part of, programmed with, networked with, and/or remote from processor 312, so the data stored in the memory 314 may be retrieved and processed by the processor 312, for example. The memory 314 may store instructions which are executable by the processor 312. The instructions may be executed to perform one or more of the acts or functions described herein or shown in the figures.

The memory 314 may store a trading application 330. In certain embodiments, the trading application 330 may be accessed from or stored in different locations. The processor 312 may access the trading application 330 stored in the memory 314 and execute computer-readable instructions included in the trading application 330.

In certain embodiments, during an installation process, the trading application may be transferred from the input device 318 and/or the network 340 to the memory 314. When the computing device 300 is running or preparing to run the trading application 330, the processor 312 may retrieve the instructions from the memory 314 via the communication network 310.

V. Example Embodiments to Provide Visual Depictions of Warnings and Errors

Figure 4:
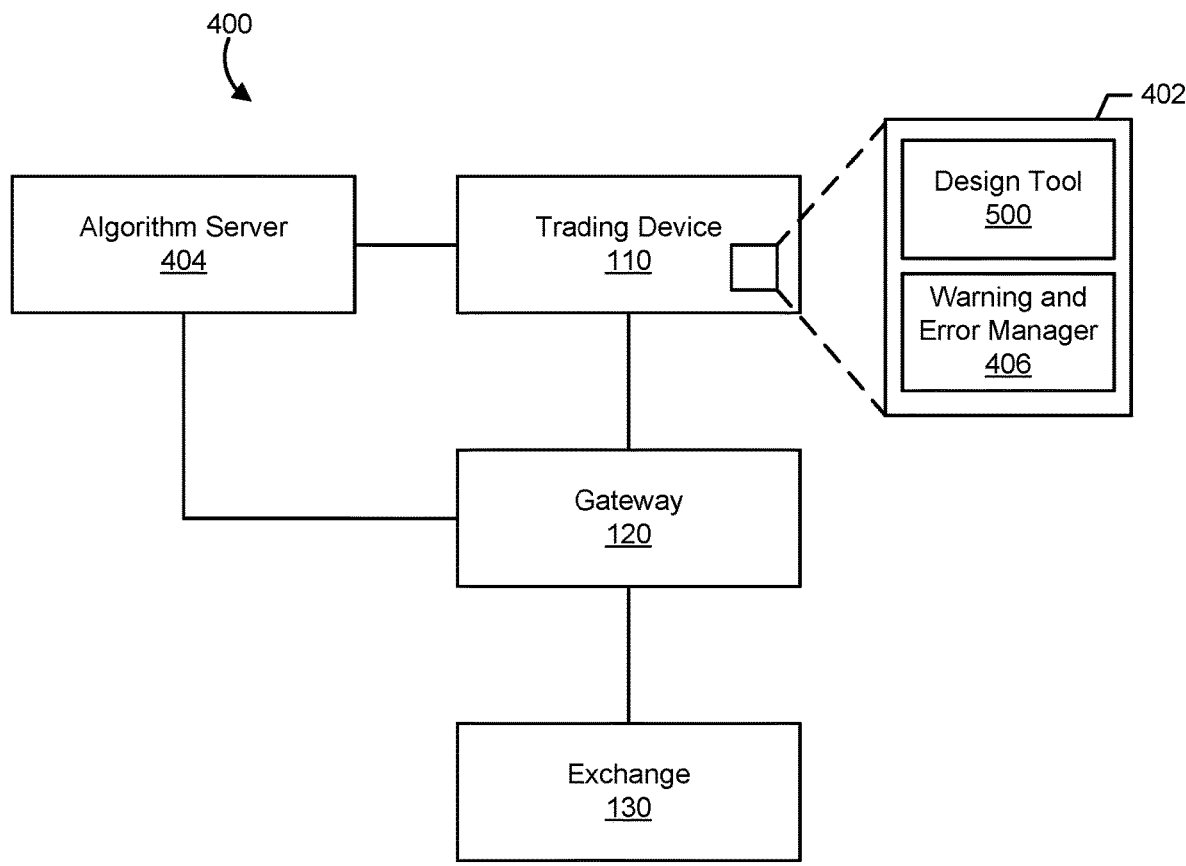
FIG. 4 illustrates a block diagram of another exemplary electronic trading system in which certain embodiments may be employed.

FIG. 4 illustrates a block diagram representative of an exemplary electronic trading system 400 in which certain embodiments may be employed. The system 400 includes the trading device 110, the gateway 120, and the exchange 130 of FIG. 1. The trading device 120 may include hardware and software configured to generate an exemplary trading interface 402 having a trading algorithm design tool 500 (see FIG. 5). The gateway 120 and the exchange 130 of FIG. 4 have been described above with reference to FIG. 1 and, thus, will not be described in detail with reference to FIG. 4. The system 400 further includes an algorithm ("algo") server 404 in communication with the trading device 110 and the gateway 120. The exemplary electronic trading system 400 depicted in FIG. 4 may be in communication with additional components, subsystems, and elements to provide additional functionality and capabilities without departing from the teaching and disclosure provided herein.

In operation, a user may interact with the trading interface 402 operable on the trading device 110 to send orders to buy or sell tradable objects at the exchange 130. For example, a user may utilize the trading interface 402 to specify the details (e.g., buy/sell, contract, price, quantity) of an order and the trading device 110 transmits the orders. The orders may be routed through the algorithm server 404 and/or the gateway 120 to the exchange 130. In addition, market data is broadcast from the exchange 130 through the gateway 120 and/or the algorithm server 404 to the trading device 110. The user may further utilize the trading interface 402 operable on the trading device 110 to monitor market data and/or base a decision to send an order for a tradable object based on conditions described in the market data.

In certain embodiments, the algorithm server 404, among other things, is configured to execute programming code corresponding to trading algorithms received from the trading device 110. In certain embodiments, the algorithm server 404 is located at the same site as the trading device 110. In certain embodiments, the algorithm server 404 is physically located at a site separate from both the trading device 110 and the gateway 120.

The algorithm server 404 is configured to receive, compile, store and execute one or more trading algorithms, programming code corresponding to the trading algorithms, one or more identifiers corresponding to the programming code and/or trading algorithms, or any combination thereof. The algorithm server 404 may, in one example, include one or more processors and one or more processor-readable media for storing such information.

In certain embodiments, the gateway 120 facilitates communication between the trading device 110 and/or the algorithm server 404 and the exchange 130. For example, the gateway 120 may receive orders from the trading device 110 and/or the algorithm server 404 and transmit the orders to the exchange 130. As another example, the gateway 120 may receive market data from the exchange 130 and transmit the market data to the algorithm server 404 and/or the trading device 110.

In certain embodiments, the algorithm server 404 is part of the trading device 110. For example, the components of the algorithm server 404 may be part of the same computing platform as the trading device 110. As another example, the functionality of the algorithm server 404 may be performed by components of the trading device 110.

In operation, a trading algorithm for autonomous or semi-autonomous electronic trading may be designed via the trading interface 402 operable on the trading device 110. The trading algorithm may, in turn, be communicated to the algorithm server 404 for compiling and/or execution. The trading algorithm may be designed and/or configured utilizing the trading algorithm design tool 500 ("the tool 500") and the trading interface 402 operable on the trading device 110. For example, a visual trading algorithm design program such as Algo Design Lab ("ADL™") provided by Trading Technologies of Chicago, Ill. may be utilized to construct one or more trading algorithms. The visual trading algorithm design program may include trading algorithm design tool 500 of the trading interface 402. The tool 500 provides an area (see the design canvas area 511 shown in FIG. 5) in which one or more blocks or objects can be configured and arranged to define a trading algorithm. In some examples, blocks are graphical representations of trading-related logic. In some examples, the blocks represent complex functionality for use in a trading algorithm. In some examples, the trading algorithm design tool 500 provides for grouping blocks placed in the design canvas area 511 (see FIG. 5). In some examples, the tool 500 provides for virtualized group blocks enabling dynamic instantiation of portions of an algorithm to handle particular discrete events. In some examples, the tool 500 allows for rapidly adjusting both the parameters and the logic of a trading algorithm, even during a single trading session. In some examples, the tool 500 provides live feedback for blocks as the trading algorithm is being designed. In some examples, the tool 500 provides for operation of some or all portions of a trading algorithm when a connection between the client device 110 and the algorithm server 404 terminates.

In some examples, the tool 500 provides safety features to reduce potential errors when a trading algorithm is designed. In some examples, the tool 500 reduces the risks of traditionally programmed algorithms such as syntax errors, unclear logic, and the need for a non-trader programmer to develop the algorithm as specified by a trader by reducing or eliminating the writing of programming code by a user. In some examples, the tool 500 provides a single application for building, debugging, and simulating (with real market data) a trading algorithm all at the same time. In addition, the trading interface 402, with or without the tool 500, may also provide for initiating the placement of orders using the trading algorithm. The trading interface 402 in general and the tool 500 are described in greater detail below with reference to FIGS. 4-6.

In certain embodiments, the tool 500 and/or the trading interface 402 include or incorporate a warning and error manager 406 to detect potential problems and/or errors within a trading algorithm designed at the trading device 110. In certain embodiments, the warning and error manager 406 identifies problems within a trading algorithm to facilitate identification and correction of a problem for the user. The warning and error manager 406 detects problems and/or errors within a trading algorithm that are logic-based and/or trading-based. For example, some problems may relate to structural components of a trading algorithm (e.g., an infinite loop) and some problems may relate to semantics of the trading algorithm (e.g., connecting a particular input to a particular output may result in an unintended trade, a particular connection my place an order at an incorrect price, etc.).

In certain embodiments, the warning and error manager 406 stores various rules related to problems and/or errors within trading algorithms. For example, patterns and/or scenarios related to problems within a trading algorithm are identified and rules are created to define those problems. In certain embodiments, rules are stored in the warning and error manager 406 for specific types of trading algorithm blocks. For example, a first trading algorithm block may be a single order block associated with a variety of logic-based rules and/or trading-based rules, while a second trading algorithm block may be a spread fill generator block associated with the same or different logic-based rules and/or trading-based rules. Moreover, some trading algorithm blocks may not have any rules associated with them. The logic-based rules and/or trading-based rules may be based on the type of algorithm block they are associated with and/or the connections that are made with the algorithm block. For example, a particular output may not be connected with a particular input of certain trading algorithm blocks. In some examples, a first trading algorithm block may not be connected to a second trading algorithm block. In some examples, certain connections may violate a rule even where there are intervening blocks contained in the trading algorithm (e.g., an unrelated block may be connected between two blocks that violate a rule).

In certain embodiments, when a user makes a change to a trading algorithm (e.g., selecting a new algorithm block and connecting it to other algorithm bocks) at the trading device 110, the warning and error manager 406 checks the trading algorithm blocks and/or their associated connections with other trading algorithm blocks against the rules to detect any problems and/or errors within the trading algorithm.

In certain embodiments, if the warning and error manager 406 detects a violation of a rule by a trading algorithm block and/or connection, the warning and error manager 406 causes an error to be displayed via the trading interface 402. The error may include a visual depiction of the error (e.g., the algorithm blocks and/or connections in violation of a rule may be highlighted), text related to the error (e.g., an explanation of the violation, a suggestion to remedy the violation, etc.), or other information related to the error. In certain embodiments, when the warning and error manager 406 detects an error in the trading algorithm, the warning and error manager 406 prevents execution of the trading algorithm (e.g., the trading algorithm may not be implemented to execute a trade at the exchange 130) until the detected error is remedied (e.g., the trading algorithm no longer violates a rule).

In certain embodiments, if the warning and error manager 406 detects a violation of a rule by a trading algorithm block and/or connection, the warning and error manager 406 causes a warning to be displayed to the user via the trading interface 402. The warning may include a visual depiction of the warning (e.g., the algorithm blocks and/or connections in violation of a rule may be highlighted), text related to the warning (e.g., an explanation of the violation, a suggestion to remedy the violation, etc.), or other information related to the warning. In certain embodiments, when the warning and error manager 406 detects a warning in the trading algorithm, the warning and error manager 406 allows the trading algorithm to be executed (e.g., the trading algorithm may be implemented to execute a trade at the exchange 130). Thus, in certain embodiments, a warning may be ignored by a user at the trading device 110 (e.g., the user may select an ignore button that removes the warning from display).

In certain embodiments, the warning and error manager 406 stores a list of ignored warnings. If a warning has been actively ignored by the user, the warning and error manager 406 does not display the warning again. In certain embodiments, if a warning is remedied by the user (e.g., the user alters the trading algorithm such that the trading algorithm complies with the rules), the warning and error manager 406 removes the warning from the ignored warnings list. Thus, if the trading algorithm is later altered such that it violates the same rule and creates the same warning, the warning and error manager 406 will cause the warning to again be displayed on the trading interface 402 for the user. Warnings and errors within a trading interface are described in greater detail below with reference to FIGS. 8-10.

The warning and error manager 406 of the illustrated example is located within the trading device 110 as a part of the trading interface 402 and/or the design tool 500. In other examples, the warning and error manager 404 may be located in the algorithm server 404 or any other component of the system 400 in communication with the trading device 110 and/or the trading interface 402.

Figure 5:
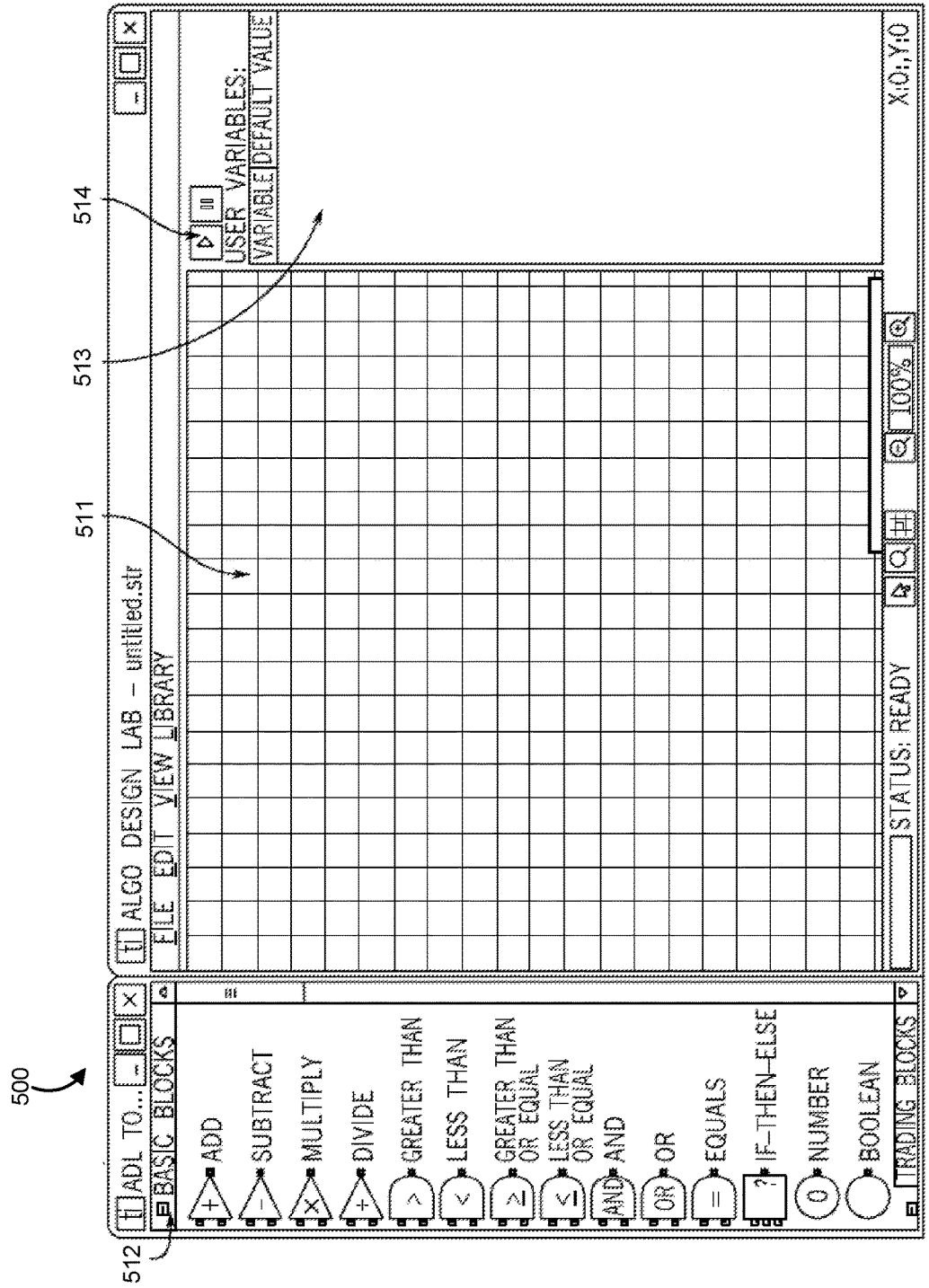
FIG. 5 illustrates a trading interface according to certain embodiments.

FIG. 5 illustrates a specific example of the trading algorithm design tool 500 that may be implemented as a part of the trading interface 402 executed by the trading device 110 (see FIGS. 1 and 4). In certain examples, the trading algorithm design tool 500 may be implemented independent of the trading interface 402. In certain examples, the trading algorithm design tool 500 may be an add-in or upgrade to the trading interface 402. The trading algorithm design tool 500 allows a trader to design a trading algorithm for electronic trading. In one example, the trading algorithm design tool 500 is the ADL™ program provided by Trading Technologies of Chicago, Ill. Example trading algorithm design tools are disclosed in U.S. patent application Ser. No. 12/905,709, entitled "User-Defined Algorithm Electronic Trading," which was filed Oct. 15, 2010, and U.S. patent application Ser. No. 12/905,726, entitled "Virtualizing for User-Defined Algorithm Electronic Trading," which was filed Oct. 15, 2010, both of which are hereby incorporated by reference in their entireties.

The trading algorithm design tool 500 includes a design canvas area 511, a block list area 512, a variable area 513, and a control area 514. In certain embodiments one or more of these areas may be in separate windows or toolbars. For example, the block list area 512 may be in a separate window from the design canvas area 511.

In operation, a trading algorithm is defined in the design canvas area 511 by utilizing one or more block from the block list area 512. Default values for user-defined variables in the algorithm may be specified using the variable area 513. Once the trading algorithm has been defined, the trading algorithm may be simulated using controls in the control area 514 to indicate how the logic of the algorithm will behave. An order to be managed according to the defined trading algorithm may then be initiated using the trading interface.

The design canvas area 511 provides for defining an algorithm. The design canvas area 511 may also be referred to as a whiteboard area. The design canvas area 511 provides a visual programming environment for designing the algorithm. Designing an algorithm includes building, testing, simulating, and/or evaluating the algorithm.

In the design canvas area 511, blocks may be arranged according to the preference of the user. In certain embodiments, the design canvas area 511 includes an overview display or map that may be used to navigate through a large algorithm with many blocks. In certain embodiments, the design canvas area 511 may be zoomed in or out so that a user may see more or less of the algorithm at a time.

Blocks are placed in the design canvas area 511 and connected to define the algorithm. The blocks to be placed may be selected from the block list area 512. Once a block has been placed, it may then be connected to other placed blocks.

The block list area 512 includes one or more blocks which may be selected and placed in the design canvas area 511. Blocks represent different functionalities that may be combined according to user preference to build an algorithm.

In general, blocks have inputs and outputs. However, certain blocks may have only inputs and others may have only outputs. For example, a pause block may have only an input. As another example, a number block may have only an output.

Inputs and outputs of blocks are of one of two primary types: continuous or discrete. A continuous type input/output, at any particular point in time (hence continuous), has a value. A discrete type input/output receives/provides discrete events (individual messages/objects) corresponding to specific actions/events that occur at some particular point in time. When a specific action/event occurs, a corresponding discrete event may be generated.

In addition to the primary type of the input/output, an input/output may have a particular value types. For example, a continuous input might have a value type of Boolean, number, integer, floating point number, or instrument. As another example, a block may have two continuous inputs of a variable value type, where the value type for the two inputs may be Boolean or numeric, for example, but must match. As another example, a discrete output might have a value type of fill confirmation. That is, the discrete output might provide fill confirmation discrete events. As another example, a discrete output might provide more than one type of discrete event for actions such as order request confirmations (indicating an order was placed), fill confirmations (indicating an order was filled or partially filled), order change confirmations (indicating a working order parameters such as price or quantity was changed), order deletion confirmations (indicating a working order was deleted or cancelled), or trade confirmations (indicating a trade has occurred). A discrete event of a particular type may include different information than a discrete event of another type. For example, an order confirmation may include information such as an order identifier and/or an instrument. As another example, a fill confirmation discrete event may include information such as an order identifier, price, quantity, instrument, and/or time of a fill. A discrete event may include user-defined information. For example, a discrete event for a fill confirmation for a filled order for instrument A may include user-defined market information such as a bid price in instrument B at the time of the fill in instrument A.

In certain embodiments, a block includes indicators of the primary type for its inputs/outputs. For example, continuous inputs/outputs may be indicated with a particular background color, foreground color, background pattern, border color, border style, shape, symbol, number, text, and/or font and discrete inputs/outputs might be indicated with another color, pattern, border, shape, symbol, number, text, and/or font.

In certain embodiments, a block includes indicators of the value type for its inputs/outputs. For example, inputs/outputs with a particular value type may be indicated with a particular background color, foreground color, background pattern, border color, border style, shape, symbol, number, text, and/or font and inputs/outputs with a different value type may be indicated with another color, pattern, border, shape, symbol, number, text, and/or font.

In certain embodiments, the primary type and/or the value type of an input or output is displayed in a pop-up window when a cursor is positioned near the block. In certain embodiments, information about the configuration of a block is displayed in a pop-up window when a cursor is positioned near the block.

Blocks represent different functionality. In the tool 500, blocks have been separated into four general categories of functionality: basic blocks, trading blocks, discrete blocks, and miscellaneous blocks. However, these groupings are for convenient organization and utilization by a user; blocks do not need to be grouped and a block's group does not necessitate particular features. Some blocks may appropriately fit in more than one category and other organizations or groupings of blocks may also be employed.

Basic blocks generally have continuous inputs and outputs and provide arithmetic operations (for example, addition, subtraction, multiplication, and division), logical operations (for example, AND, OR, and comparison such as equality, greater than, and less than), constant values (for example, number and Boolean), and if-then-else constructs.

Trading blocks generally provide more complex functionality related to manipulating an order (for example, placing an order, modifying an existing order, or deleting an order) or order-related information (for example, a fill confirmation). Trading blocks may have both continuous and discrete inputs and outputs. For example, a market maker block may have continuous inputs for specifying an instrument, price, quantity, and condition for quoting an order and may have a continuous output of the working quantity and a discrete output for providing notification of fills. Trading blocks allow users, including non-programmers (such as traders), to utilize a visual design environment (such as that provided by the ADL™) to create, configure and deploy trading algorithms. The trading blocks may allow for more rapid and accurate design of an algorithm as compared to a typical programmer with fewer steps or instructions as compared to other visual programming platforms.

Discrete blocks generally have discrete inputs and outputs and provide operations based on the occurrence of discrete events. For example, a generator block may generate an occurrence of a discrete event. As another example, a value extractor block may extract a value from a discrete event and make it available as a continuous value to another portion of the algorithm. As another example, a sequencer block may be used to control the sequence in which subsequent blocks are processed in response to a discrete event. Certain discrete blocks may store data to be referenced at a subsequent time. For example, a value accumulator block may receive a discrete event and extract a user-specified value from it. The extracted value may be accumulated with values extracted from each received discrete event.

Miscellaneous blocks provide a variety of functionality that may not necessary fit into the above-discussed categories. For example, these blocks may provide special purpose or more complex calculations or may add additional control to the execution of the algorithm itself. Further, miscellaneous blocks may provide more precise tools to control risk, convert numbers into tradable values, or use time (either precise or elapsed) as an input or variable.

Figure 6:
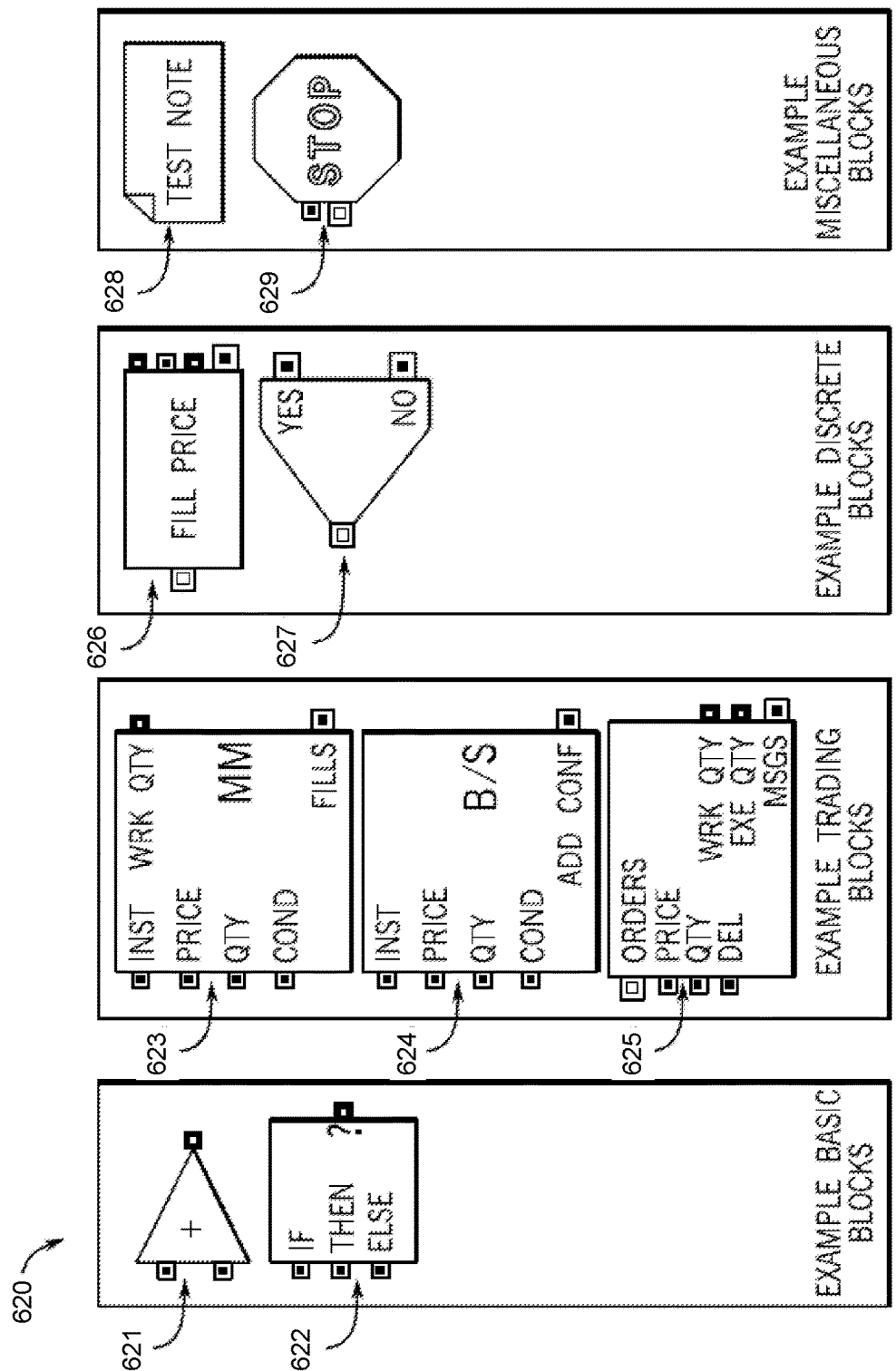
FIG. 6 illustrates examples of blocks that may be used in the trading interface of certain embodiments.

FIG. 6 illustrates examples of blocks 620 that may be used to construct a trading algorithm in the trading algorithm design tool 500 of FIG. 5 according to certain embodiments. Example blocks from each of the categories identified above are illustrated. Example basic blocks include the add block 621 and the if-then-else block 622. Example trading blocks include the market maker block 623, the conditional buy/sell block 624, and the order handler block 625. Example discrete blocks include the value extractor block 626 and the branch block 627. Example miscellaneous blocks include the note block 628 and the pause block 629.

Basic blocks may include add, subtract, multiply, divide, greater than, less than, greater than or equal, less than or equal, AND, OR, equals, IF-THEN-ELSE, number, Boolean, and constant blocks, for example.

Trading blocks may include instrument, instrument attribute, market maker, legger, custom spread, responsive buy/sell, conditional buy/sell, order handler, IF-THEN-ELSE instrument, instrument attribute at price, spread between, trade, order, fill calculator, and fill accumulator blocks, for example.

Discrete blocks may include generator, value extractor, value accumulator, value bucket, discrete moving average, state, branch, multiplexer, funnel, sequencer, discrete min, and discrete max blocks, for example.

Miscellaneous blocks may include min, max, rounding, display to decimal, not, once true, is number, moving average, conditional f(x), numeric f(x), average, timer, note, random number, square root, log, and pause blocks, for example.

Figure 7:
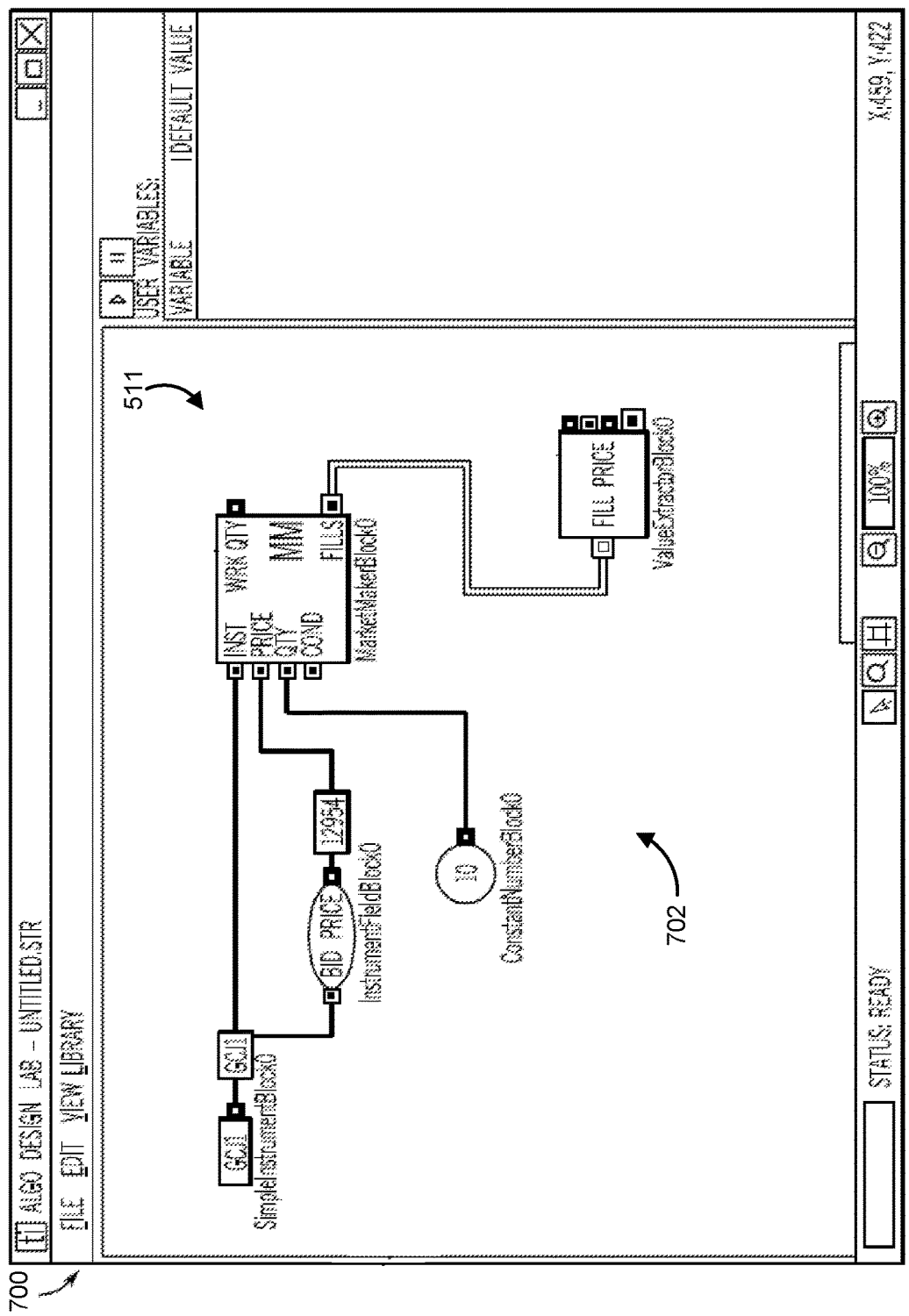
FIG. 7 illustrates another example trading interface according to certain embodiments.

FIG. 7 illustrates an example of the trading algorithm design tool 500 generally indicated by the reference numeral 700. The example trading algorithm design tool 700 includes various algorithm blocks connected to define a simple trading algorithm 702. The trading algorithm 702 provides a mechanism to buy ten (10) instruments (i.e., instruments represented by the GCJ1 identifier) at a price of 12954 and return the price at which those instruments were purchased. In this example, the trading algorithm design tool 500 (700 in the present example) provides a live feedback feature that provides a display of a value for the particular block.

Instructions or logic (herein referred to as programming code) representing the algorithm are generated based on the definition of the algorithm. In some examples, the programming code is source code (such as human and/or compiler readable text) which may subsequently be compiled. In some examples, the programming code is in an intermediate language. In some examples, the programming code includes machine-executable instructions. In some examples, generation of programming code includes compilation of generated source code and/or intermediate language code. In some examples, generation of programming code does not include compilation of generated source code and/or intermediate language code and such compilation is a separate process. The generated programming code (after compilation, if appropriate) may then be simulated and/or used to trade according to the defined algorithm. As used herein, where programming code is discussed to be run, executed, and/or simulated, it is assumed that the generated programming code has additionally been compiled, if appropriate to be run, executed, and/or simulated.

In some examples, the programming code is generated as the algorithm is being designed. Note that while the algorithm is being designed and/or configured, the definition of the algorithm may be changing as blocks and/or connections are added, modified, and/or removed. In some examples, the programming code is generated automatically when a change is made to the algorithm definition. In some examples, the programming code is generated at the request of a user.

In some examples, the programming code is generated when the trading algorithm 702 is compiled by the tool 500 of FIG. 5 at a client device (e.g., the trading device 110 of FIGS. 1 and/or 4). In some examples, the programming code is generated by a component of the algorithmic trading application at another device, such as a algorithm generation device, an algorithm server similar to the algorithm server 404 discussed above with reference to FIG. 4, and/or a gateway similar to the gateway 120 discussed above with reference to FIGS. 1 and/or 4, for example. In some examples, the programming code is generated by more than one component. For example, multiple components of the algorithmic trading application may work together to generate the code. Such components may be specialized to generate different aspects or functionalities of the programming code, for example. In some examples, the generated programming code is done in an object-oriented manner using a programming language such as C# and the .NET 4.0 framework. In some examples, the programming code is generated by traversing each block and connection in the algorithm definition. For each block, programming code is generated.

Continuous connections between blocks specify how the connected output values and input values relate. Discrete connections between blocks are used to generate event generators and event handlers so that the proper method (the handler) is invoked when a discrete event is generated. The discrete event is passed from the event generator to the event handler to be processed. When running, the algorithm responds to actions that cause the state of the algorithm to change. The actions may include external events such as market events (for example, a price update, quantity update, order confirmation, trade confirmation, fill confirmation, or trade notification) or timer events (for example, from a system clock or alarm). These external events may result in discrete events being generated such as order confirmation discrete events, trade confirmation discrete events, fill confirmation discrete events, or trade notification discrete events and/or continuous values such as price or quantity values for an instrument being updated. The actions may also include internal events such as discrete events generated by blocks in the algorithm or continuous values changing.

Figure 8:
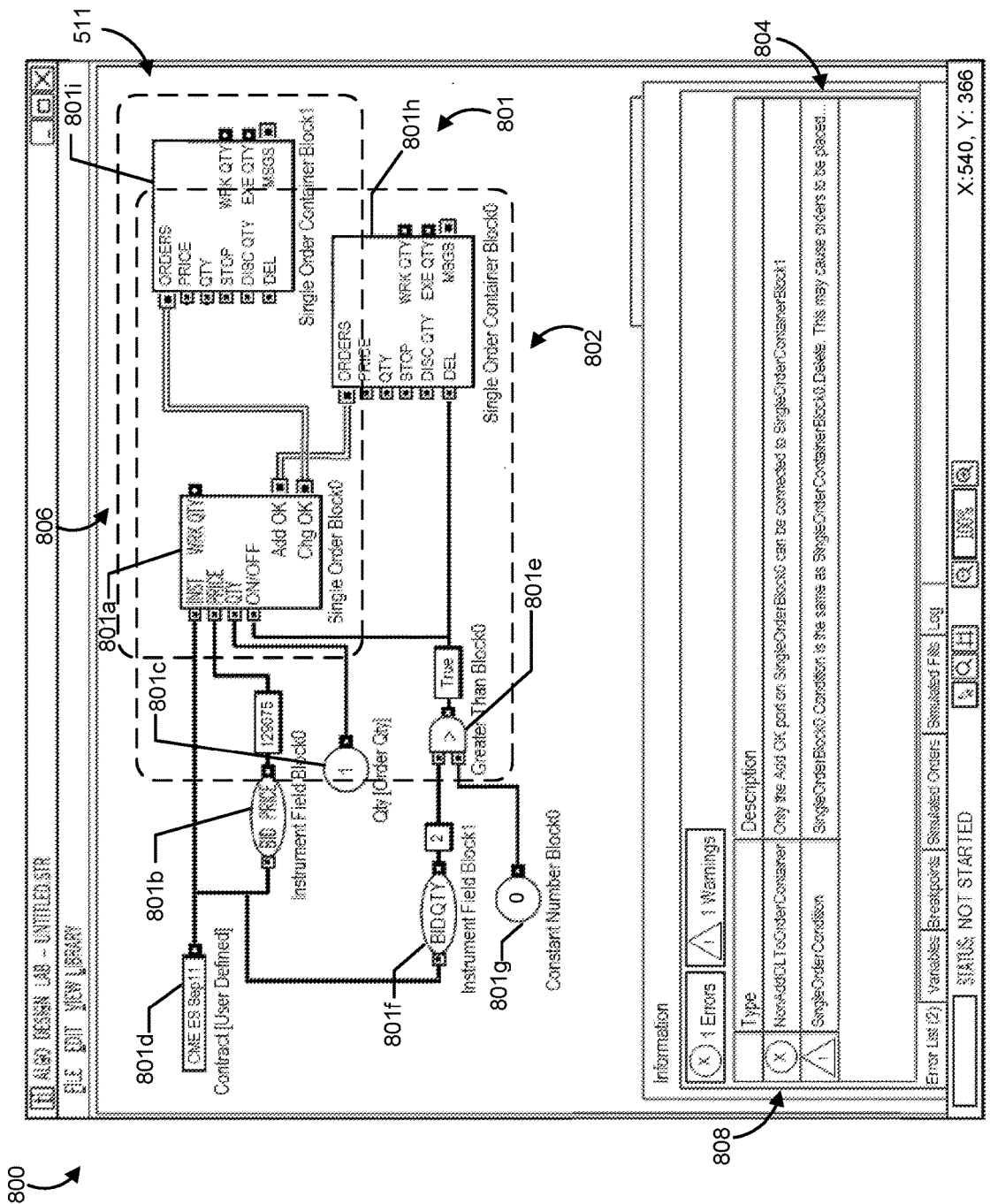
FIG. 8 illustrates another example trading interface according to certain embodiments.

FIG. 8 illustrates an example of the trading algorithm design tool 500 generally indicated by the reference numeral 800. The example trading algorithm design tool 800 is displayed via the trading interface 402 operable on a trading device (e.g., the trading device 110 of FIGS. 1 and/or 4) when a warning and/or an error is detected by the warning and error manager 406 of FIG. 4. While the example trading algorithm design tool 800 depicts both a single warning and a single error present in a trading algorithm 801, any number of warnings and/or errors may be detected by the warning and error manager 406 and displayed in the design canvas area 511 (see FIG. 5) of the example trading algorithm design tool 800.

Generally, the trading algorithm 801 of the illustrated example provides mechanisms to place an order for a particular amount of instruments at a particular price when certain conditions are met and to modify the order when other conditions are met. The trading block 801a is a single order block to place a single order in the market at a specified price (defined by block 801b) and quantity (defined by block 801c) for a particular commodity (defined by block 801d). The trading block 801a will place the single order if a particular condition is true (defined by block 801e). Specifically, the trading block 801a will place the single order if a quantity (defined by block 801f) is greater than zero (defined by block 801g). If the quantity (defined by block 801f) is not greater than zero (defined by block 801g), the particular condition will be false (defined by block 801e) and the trading block 801a will not place the single order.

Single order container blocks 801h, 801i are used to modify orders placed by the trading block 801a. The blocks 801h, 801i may modify quantity and/or prices of orders after they have been placed by the trading block 801a. The blocks 801h, 801i may also delete orders after they have been placed by the trading block 801a. Specifically, the trading block 801h will delete an order if a quantity (defined by block 801f) is greater than zero (defined by block 801g) according to block 801e. Thus, in the illustrated example, the same input from trading block 801e is connected to both the trading block 801a to cause the trading block 801a to place orders and the trading block 801h to cause the trading block 801h to delete orders. Such a configuration or layout may cause the trading algorithm 801 to violate a trading rule according to the warning and error manager 406 because the trading algorithm 801 may constantly add and delete orders, requiring many messages to be sent to an exchange, which may result in fined from the exchange.

The trading blocks 801h, 801i receive an input to identify the order to be modified and/or deleted. The order input to the trading blocks 801h, 801i is to be connected to an "Add OK" port of the trading block 801a. The "Add OK" port of the trading block 801a outputs a message identifying the order placed by the trading block 801a once the order has been sent to the exchange and a confirmation message has been received from the exchange in response to the order being placed. In the illustrated example, the order input of the trading block 801i is connected to the "Chg OK" port of the trading block 801a rather than the "Add OK" port of the trading block 801a. Such a configuration or layout may cause the trading algorithm 801 to violate a trading rule according to the warning and error manager 406. Design flaws in the trading algorithm 801 result in a variety of warnings and errors to be displayed by the example trading algorithm design tool 800.

In the illustrated example, a warning 802 is indicated in the design canvas area 511 of the example trading algorithm design tool 800 with a dashed yellow line surrounding the trading blocks (e.g., blocks 801a, 801e, 801h) that are found to violate a trading rule by the warning and error manager 406. Warning information 804 associated with the warning 802 is also displayed in the example trading algorithm design tool 800. The warning information 804 explains the connection that has caused the warning 802 to be detected by the warning and error manager 406. Specifically, the warning information 804 explains that a single order condition block (block 801e) is also connected to a single order delete (block 801h) and that this connection may cause an order to be placed and then to be immediately deleted. In the illustrated example, the warning 802 is shown as a dashed yellow line surrounding the trading blocks 801a, 801e, 801h. In other examples, the warning 802 may provide any other visual indication of a violation of a rule by particular trading blocks. In the illustrated example, the warning information 804 provides text related to the warning 802. In other examples, the warning information 804 may provide any other text, visual, or audio information related to the warning 802. For example, the warning information 804 may provide a suggested solution to correct the trading algorithm.

In the example of FIG. 8, an error 806 indicated in the design canvas area 511 (see FIG. 5) of the example trading algorithm design tool 800 with a dashed red line surrounding the trading blocks (e.g., blocks 801a, 801i) that are found to violate a trading rule by the warning and error manager 406. Error information 808 associated with the error 806 is also displayed in the example trading algorithm design tool 800. The error information 808 explains the connection that has caused the error 806 to be detected by the warning and error manager 406. Specifically, the error information 808 explains that only an "Add OK" port on a single order block (block 801a) may be connected to a single order container block (block 801i). In the illustrated example, the error 806 is shown as a dashed red line surrounding the trading blocks 801a, 801i. In other examples, the error 806 may provide any other visual indication of a violation of a rule by particular trading blocks. In the illustrated example, the error information 808 provides text related to the error 806. In other examples, the error information 808 may provide any other text, visual, or audio information related to the error 806. For example, the error information 808 may provide a suggested solution to correct the trading algorithm.

Figure 9:
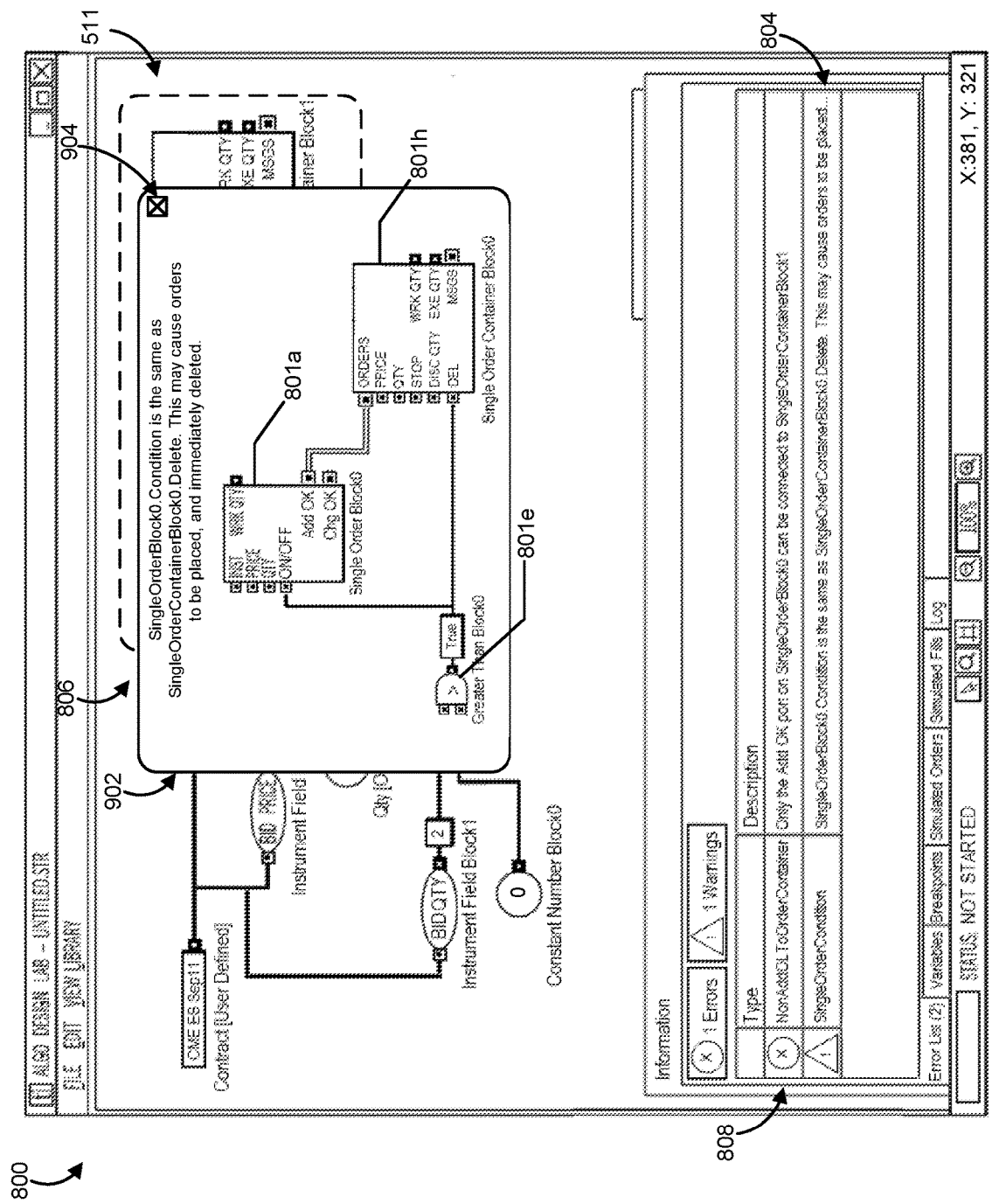
FIG. 9 illustrates another example trading interface according to certain embodiments.

FIG. 9 illustrates the example trading algorithm design tool 800 in accordance with certain embodiments. The example of FIG. 9 illustrates the example trading algorithm design tool 800 when the warning 802 of FIG. 8 in the design canvas area 511 has been selected by a user. Once selected, the warning 802 appears as a warning 902 in FIG. 9. The warning 902 is depicted in the trading interface 800 with a solid yellow line surrounding the trading blocks (e.g., blocks 801a, 801e, 801h) that are found to violate a trading rule by the warning and error manager 406. The text of the warning information 804 associated with the warning 802 is also displayed within the warning 902 of FIG. 9. The warning 902 shows the trading blocks found to violate the trading rule on a solid white background to further highlight the affected blocks. However, the warning 902 does not obstruct the trading algorithm as a whole from being manipulated by a user. For example, the trading blocks remain interactive (e.g., the blocks 801a, 801e, 801h may be selected by a user) and may be manipulated within and/or outside of the warning 902. In some examples, the warning 902 may obstruct the trading algorithm (e.g., the user may not manipulate the trading algorithm 801).

The warning 902 also includes an ignore button 904 that allows the user to actively ignore the warning 902. If the warning 902 is actively ignored by the user, the warning and error manager 406 of FIG. 4 adds the warning 902 to an ignored warning list so that the warning and error manager 406 will not display the warning 902 again. The warning and error manager 406 allows the trading algorithm 801 to be executed even where the trading algorithm 801 contains warnings (e.g., the warning 902). In the illustrated example, the warning 902 is shown as a solid yellow line surrounding the trading blocks 801a, 801e, 801h. In other examples, the warning 902 may provide any other visual indication of a violation of a rule by particular trading blocks. In the illustrated example, the warning 902 provides text related to the warning (e.g., the warning information 804). In other examples, the warning 902 may provide any other text, visual, or audio information related to the warning.

Figure 10:
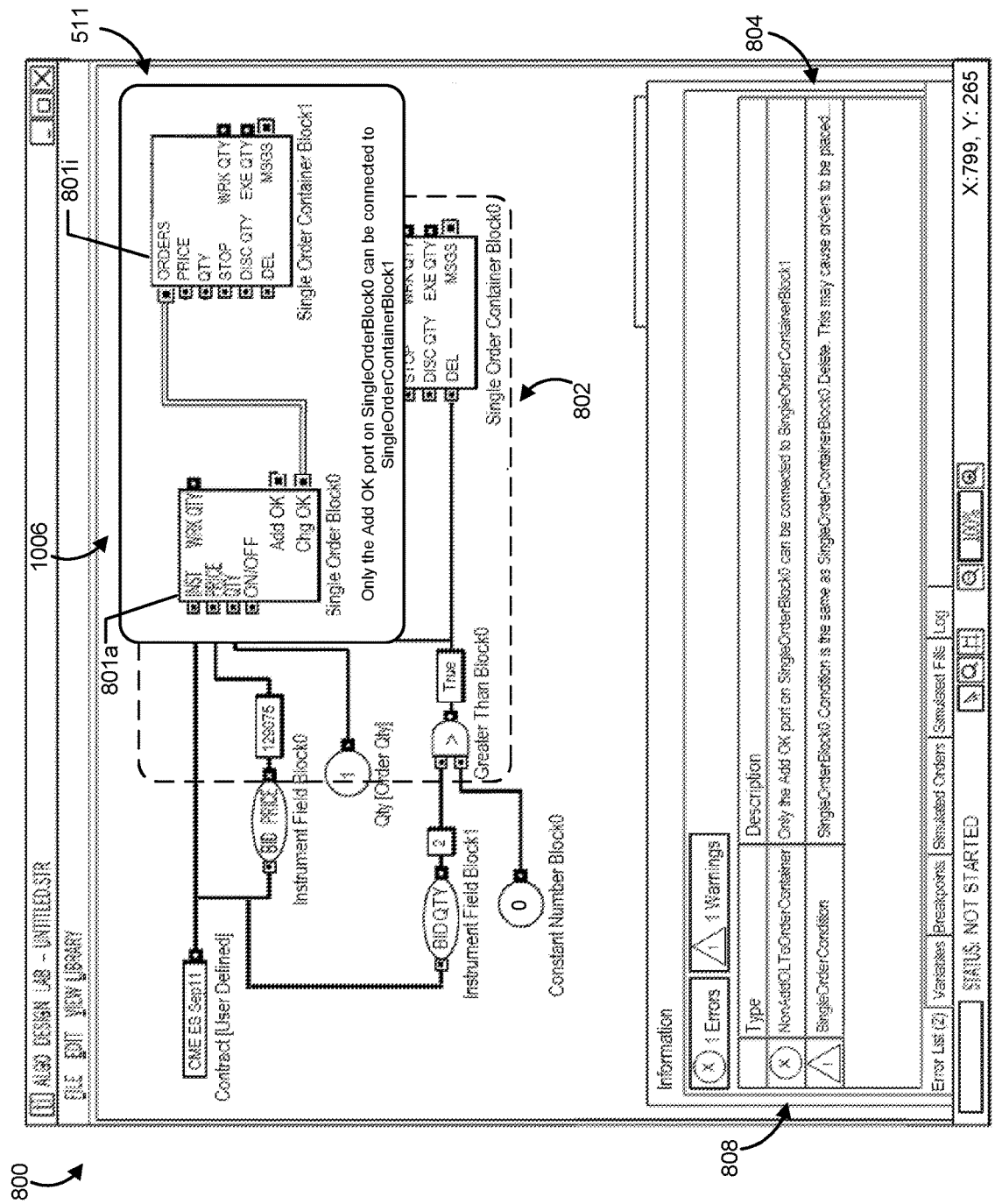
FIG. 10 illustrates another example trading interface according to certain embodiments.

FIG. 10 illustrates the example trading algorithm design tool 800 in accordance with certain embodiments. The example of FIG. 10 illustrates the trading algorithm design tool 800 when the error 806 of FIG. 8 in the design canvas area 511 has been selected by a user. Once selected, the error 806 appears as an error 1006 in FIG. 10. The error 1006 is depicted in the trading algorithm design tool 800 with a solid red line surrounding the trading blocks (e.g., blocks 801*a*, 801*i*) that are found to violate a trading rule by the warning and error manager 406. The text of the error information 808 associated with the error 806 is also displayed within the error 1006 of FIG. 10. The error 806 shows the trading blocks found to violate the trading rule on a solid white background to further highlight the effected blocks. However, the error 806 does not obstruct the trading algorithm as a whole from being manipulated by a user. For example, the trading blocks remain interactive (e.g., blocks 801, 801*i* may be selected by a user) and may be manipulated within and/or outside of the error 806. In some examples, the error 806 may obstruct the trading algorithm (e.g., the user may not manipulate the trading algorithm 801).

The warning and error manager 406 does not allow the trading algorithm 801 to be executed when the trading algorithm 801 contains errors (e.g., the error 1006). In the illustrated example, the error 1006 is shown as a solid red line surrounding the trading blocks 801*a*, 801*i*. In other examples, the error 1006 may provide any other visual indication of a violation of a rule by particular trading blocks. In the illustrated example, the error 1006 provides text related to the warning (e.g., the warning information 808). In other examples, the error 1006 may provide any other text, visual, or audio information related to the warning.

Figure 11:
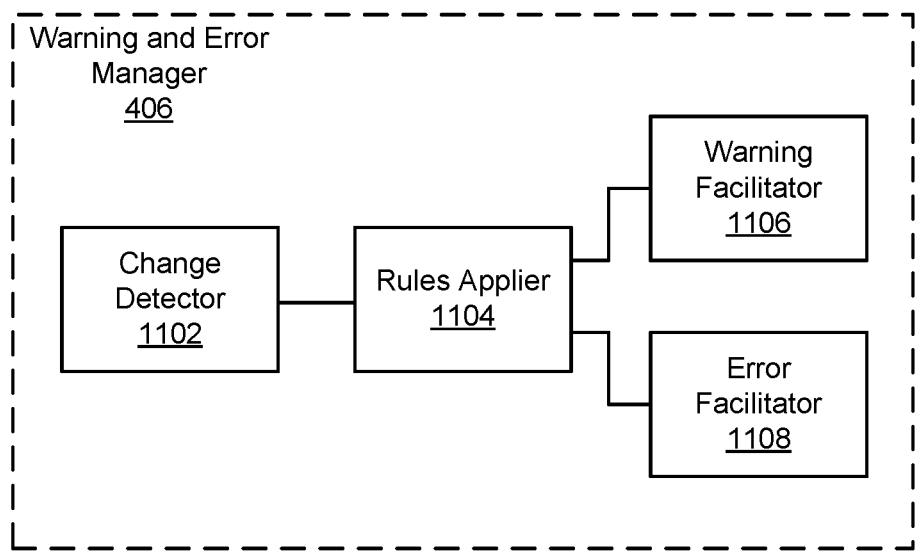
FIG. 11 illustrates a block diagram of the example warning and error manager of FIG. 4.

FIG. 11 is a block diagram of an example warning and error manager, such as the warning and error manager 406 of FIG. 4. In certain embodiments, the warning and error manager 406 detects problems within a trading algorithm designed at a trading device (e.g., the trading device 110 of FIGS. 1 and/or 4). In certain embodiments, the warning and error manager 406 identifies problems within a trading algorithm for a user to facilitate correction of such problems. In certain embodiments, the warning and error manager 406 includes a change detector 1102, a rules applier 1104, a warning facilitator 1106, and an error facilitator 1108.

In certain embodiments, the change detector 1102 detects structural changes within a trading algorithm designed by a user at the trading device 110. For example, a structural change detected by the change detector 1102 may include an addition of a trading block and/or an added connection to a trading block. In some examples, other changes to a trading algorithm are detected by the change detector 1102.

In certain embodiments, the rules applier 1104 stores various rules related to problems and/or errors within trading algorithms. In certain embodiments, rules are stored in the rules applier 1104 for specific types of trading algorithm blocks. For example, a first trading algorithm block may have a variety of logic-based rules and/or trading-based rules associated with it. A second trading algorithm block may have the same or different logic-based rules and/or trading-based rules associated with it. Some trading algorithm blocks may not have any rules associated with them. The rules may be logic-based (e.g., identification of an infinite loop) and/or trading-based (e.g., connecting a particular input to a particular output may result in an unintended trade). The logic-based rules and/or trading-based rules may be based on the type of algorithm block they are associated with and/or the connections that are made with the algorithm block. For example, a particular output may not be connected with a particular input of certain trading algorithm blocks. In some examples, a first trading algorithm block may not be connected to a second trading algorithm block. In some examples, certain connections may violate a rule even where there are intervening blocks contained in the trading algorithm (e.g., an unrelated block may be connected between two blocks that violate a rule).

In certain embodiments, the rules are identified as creating either warnings or errors. For example, the violation of certain rules may result in display of a warning while the violation of other rules may result in display of an error. In certain embodiments, the rules define the manner in which warnings and/or errors are implemented. For example, the rules may define the manner in which warnings and/or errors are displayed (e.g., color, font, highlighting, etc.) and/or text associated with the warnings and/or errors that is displayed. As described above, a warning may not prevent a trading algorithm from executing while an error may prevent a trading algorithm from executing. In certain embodiments, the rules applier 1104 includes a database to store the rules. In other embodiments, a separate database may be used to the store the rules.

Once the change detector 1102 has detected a change in a trading algorithm, the rules applier 1104 checks the trading algorithm blocks and/or their associated connections with other trading algorithm blocks against the rules to detect any problems and/or errors within the trading algorithm. To check the trading blocks and/or their associated connections for rules violations, the rules applier 1104 iterates through each trading block and each connection within a trading algorithm. In certain embodiments, the rules applier 1104 selects a trading block and determines if there are any rules associated with that particular trading block. As explained above, certain rules may apply to certain types of trading blocks. If rules are associated with the selected trading block, those rules are accessed by the rules applier 1104.

In certain embodiments, the rules applier 1104 selects an input to the selected trading block. The rules applier 1104 determines if a direct connection and/or an indirect connection (e.g., with intervening blocks) to the selected input violates any rules associated with the trading block. If any such connection violates a rule, the warning facilitator 1106 and/or the error facilitator 1108 facilitate warning and/or error handling. The rules applier 1104 iterates through each input of the selected trading block to check for rules violations.

In certain embodiments, the rules applier 1104 selects an output of the selected trading block. The rules applier 1104 determines if a direct connection and/or an indirect connection (e.g., with intervening blocks) to the selected output violates any rules associated with the trading block. If any such connection violates a rule, the warning facilitator 1106 and/or the error facilitator 1108 facilitate warning and/or error handling. The rules applier 1104 iterates through each output of the selected trading block to check for rules violations.

In certain embodiments, once the rules applier 1104 has iterated through each input and output of the selected trading block, the rules applier 1104 selects another trading block in the trading algorithm and checks the newly selected trading block for rules violations in a similar manner as that described above.

In certain embodiments, if the rules applier 1104 detects a violation of a rule resulting in a warning, the warning facilitator 1106 causes a warning to be displayed to the user at the trading device 110. The warning may include a visual depiction of the warning (e.g., the algorithm blocks and/or connections in violation of a rule may be highlighted), text related to the warning (e.g., an explanation of the violation, a suggestion to remedy the violation, etc.), or other information related to the warning. In certain embodiments, the warning facilitator 1106 identifies the trading blocks in violation of the rules and implements a display of a box around those trading blocks. In certain embodiments, when the rules applier 1104 detects a warning in the trading algorithm, the warning facilitator 1106 allows the trading algorithm to be executed (e.g., the trading algorithm may be implemented to execute a trade at an exchange). In certain embodiments, the warning facilitator 1106 saves a list of warnings for future use and/or deployment of the trading algorithm.

In certain embodiments, a warning may be ignored by a user at the trading device 110 (e.g., the user may select an ignore button that removes the warning from display). In certain embodiments, the warning facilitator 1106 stores a list of ignored warnings. The list of ignored warnings may include unique identifiers for the trading blocks associated with the warnings. If a warning has been actively ignored by the user, the warning facilitator 1106 does not display the warning again. However, in certain examples, if the trading blocks associated with the warning are duplicated in the trading algorithm, those trading blocks will have a different identifier than the original trading blocks associated with the warning, and a separate warning will be generated for the duplicated trading blocks. In certain embodiments, if a warning is remedied by the user (e.g., the user alters the trading algorithm such that the trading algorithm complies with the rules), the warning facilitator 1106 removes the warning from the ignored warnings list. Thus, if the trading algorithm is later altered such that it violates the same rule and creates the same warning, the warning facilitator 1106 will cause the warning to again be displayed on the trading device 110 for the user.

In certain embodiments, if the rules applier 1104 detects a violation of a rule resulting in an error, the error facilitator 1108 causes an error to be displayed to the user at the trading device 110. The error may include a visual depiction of the error (e.g., the algorithm blocks and/or connections in violation of a rule may be highlighted), text related to the error (e.g., an explanation of the violation, a suggestion to remedy the violation, etc.), or other information related to the error. In certain embodiments, the error facilitator 1108 identifies the trading blocks in violation of the rules and implements a display of a box around those trading blocks. In certain embodiments, when the rules applier 1104 detects an error in the trading algorithm, the error facilitator 1108 prevents the trading algorithm from being executed (e.g., the trading algorithm may not be implemented to execute a trade at an exchange) until the error is remedied (e.g., the trading algorithm no longer violates a rule). In certain embodiments, the error facilitator 1108 saves a list of errors such that, when the trading algorithm is deployed, the trading algorithm is not allowed to execute until the list of errors is cleared. In such an example, the list of errors is saved for future use and/or deployment of the trading algorithm.

In certain embodiments, a warning and/or an error may be overridden at the trading device 110. In some examples, to override a warning and/or an error, a user may need authorization to perform such an override function (e.g., a supervisor may be given permission to perform an override of a warning and/or an error). In some examples, to override a warning and/or an error, a user may need to provide verification of the user's identity (e.g., the user may be required to input a password associated with a username).

Figure 12:
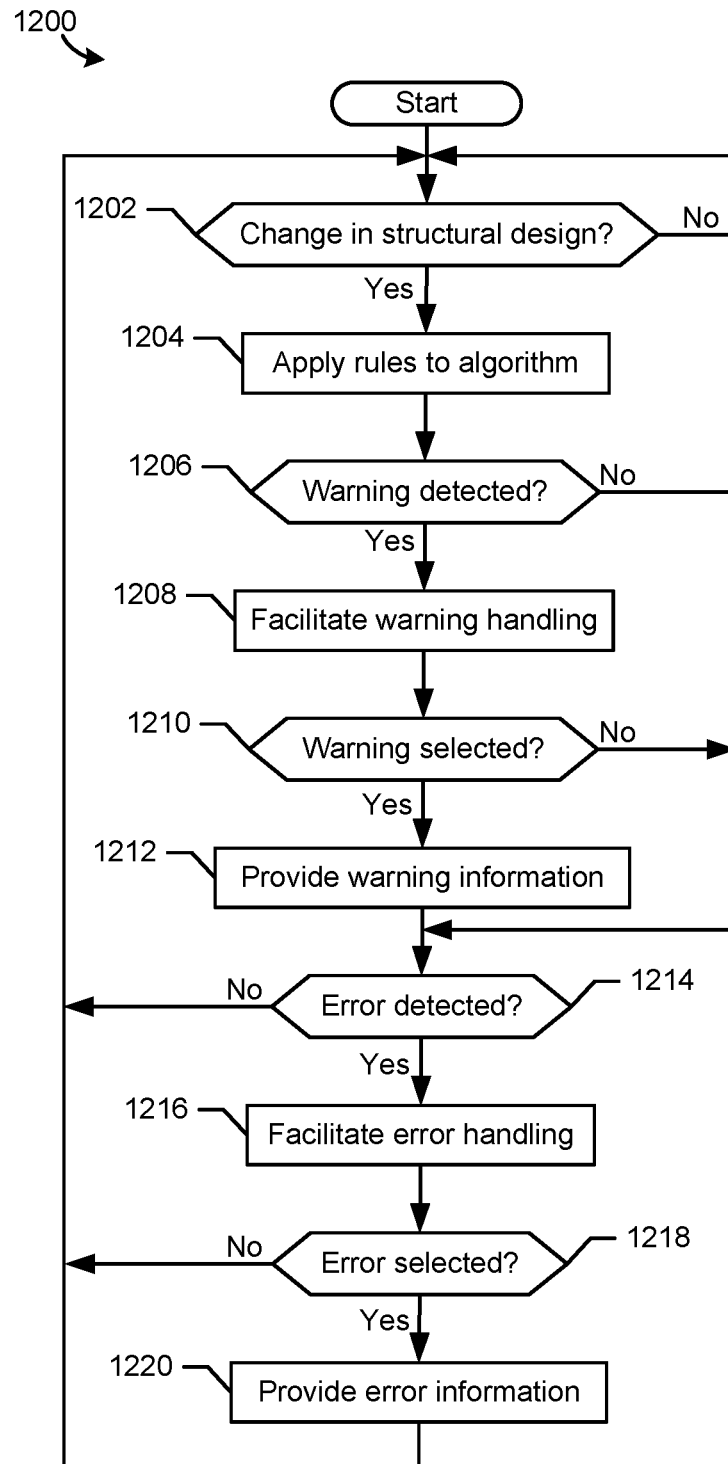
FIG. 12 illustrates a flow diagram of an example method for managing warnings and errors in an electronic trading system.

FIG. 12 illustrates a flow diagram of an example method 1200 to manage warnings and/or errors in a trading algorithm. In certain embodiments, the change detector 1102 detects structural changes within a trading algorithm designed by a user at a trading device (e.g., the trading device 110 of FIGS. 1 and/or 4) (1202). For example, a structural change detected by the change detector 1102 may include an addition of a trading block and/or an added connection to a trading block. Control remains at 1202 until a structural change is detected. In some examples, other changes to a trading algorithm are detected by the change detector 1102.

In certain embodiments, the rules applier 1104 applies rules to the trading algorithm (1204). The rules applier 1104 stores various rules related to problems and/or errors within trading algorithms. The rules applier 1104 applies these rules to each trading block within the trading algorithm to detect warnings and/or errors. To check the trading blocks and/or their associated connections for rules violations, the rules applier 1104 iterates through each trading block and each connection within a trading algorithm. An example method for applying rules to trading blocks is described below in connection with FIG. 13. If the rules applier 1104 detects a warning within the trading algorithm (e.g., a trading block and/or connection violates a rule that results in a warning) (1206), the warning facilitator 1106 facilitates warning handling (1208). If the rules applier 1104 does not detect a warning within the trading algorithm (1206), control proceeds to the error detection portion of the method 1200 beginning at 1214.

To facilitate warning handling, in certain embodiments, the warning facilitator 1106 causes a warning to be displayed to the user at the trading device 110. The warning may include a visual depiction of the warning (e.g., the algorithm blocks and/or connections in violation of a rule may be highlighted). In certain embodiments, the warning facilitator 1106 identifies the trading blocks in violation of the rules and implements a display of a box around those trading blocks. In certain embodiments, when the rules applier 1104 detects a warning in the trading algorithm, the warning facilitator 1106 allows the trading algorithm to be executed (e.g., the trading algorithm may be implemented to execute a trade at an exchange). If the warning is selected by a user (1210), the warning facilitator 1106 provides text related to the warning (e.g., an explanation of the violation, a suggestion to remedy the violation, etc.), or other information related to the warning (1212). If the warning is not selected by the user (1210), control proceeds to the error detection portion of the method 1200 beginning at 1214.

If the rules applier 1104 detects an error within the trading algorithm (e.g., a trading block and/or connection violates a rule that results in an error) (1214), the error facilitator 1108 facilitates error handling (1216). If the rules applier 1104 does not detect an error within the trading algorithm (1214), control returns to 1202 to await detection of further changes in the structural design of the trading algorithm.

To facilitate error handling, in certain embodiments, the error facilitator 1108 causes an error to be displayed to the user at the trading device 110. The error may include a visual depiction of the error (e.g., the algorithm blocks and/or connections in violation of a rule may be highlighted). In certain embodiments, the error facilitator 1108 identifies the trading blocks in violation of the rules and implements a display of a box around those trading blocks. In certain embodiments, when the rules applier 1104 detects an error in the trading algorithm, the error facilitator 1108 does not allow the trading algorithm to be executed (e.g., the trading algorithm may not be implemented to execute a trade at an exchange). If the error is selected by the user (1218), the error facilitator 1108 provides text related to the error (e.g., an explanation of the violation, a suggestion to remedy the violation, etc.), or other information related to the error (1220). If the error is not selected by the user (1218), control returns to 1202 to await detection of further changes in the structural design of the trading algorithm.

Figure 13:
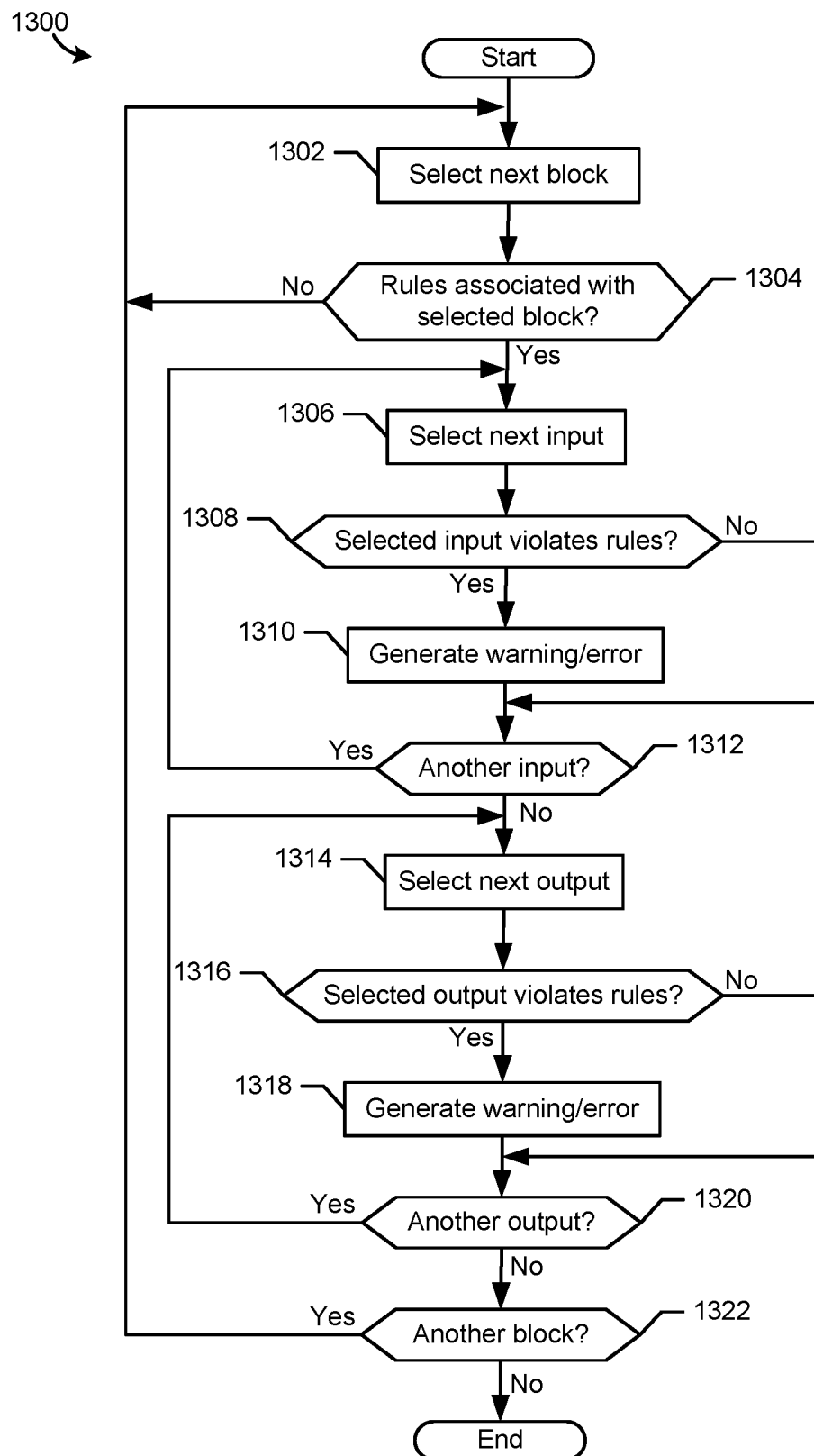
FIG. 13 illustrates a flow diagram of another example method for managing warnings and errors in an electronic trading system.

FIG. 13 illustrates a flow diagram of an example method 1300 to apply rules to a trading algorithm. In certain embodiments, rules are stored in the rules applier 1104 for specific types of trading algorithm blocks. The rules may be logic-based (e.g., an infinite loop) and/or trading-based (e.g., connecting a particular input to a particular output may result in an unintended trade). The logic-based rules and/or trading-based rules may be based on the type of algorithm block they are associated with and/or the connections that are made with the algorithm block. In some examples, certain connections may violate a rule even where there are intervening blocks contained in the trading algorithm (e.g., an unrelated block may be connected between two blocks that violate a rule). In certain embodiments, the rules are identified as creating either warnings or errors. For examples, the violation of certain rules may result in display of a warning while the violation of other rules may result in display of an error. In certain embodiments, the rules define the manner in which warnings and/or errors are implemented.

In certain embodiments, the rules applier 1104 checks the trading algorithm blocks and/or their associated connections with other trading algorithm blocks against the rules to detect any problems and/or errors within the trading algorithm. To check the trading blocks and/or their associated connections for rules violations, the rules applier 1104 iterates through each trading block and each connection within a trading algorithm. In certain embodiments, the rules applier 1104 selects a trading block (1302) and determines if there are any rules associated with that particular trading block (1304). As explained above, certain rules may apply to certain types of trading blocks. If rules are associated with the selected trading block, those rules are accessed by the rules applier 1104. If there are no rules associated with the selected trading block, control returns to 1302.

In certain embodiments, the rules applier 1104 selects an input to the selected trading block (1306). The rules applier 1104 determines if the selected input violates the rules (1308). For example, the rules applier 1104 determines if a direct connection and/or an indirect connection (e.g., with intervening blocks) to the selected input violates any rules associated with the trading block. If any such connection violates a rule, the warning facilitator 1106 and/or the error facilitator 1108 generates a warning and/or error (1310). If the selected input does not violate the rules, control proceeds to 1312. The rules applier 1104 determines if there is another input of the selected trading block to be checked (1312). If there is another input of the selected trading block to be checked (1312), control returns to 1306. If there is not another input of the selected trading block to be checked (1312), control proceeds to 1314.

In certain embodiments, the rules applier 1104 selects an output of the selected trading block (1314). The rules applier 1104 determines if the selected output violates the rules (1316). For example, the rules applier 1104 determines if a direct connection and/or an indirect connection (e.g., with intervening blocks) to the selected output violates any rules associated with the trading block. If any such connection violates a rule, the warning facilitator 1106 and/or the error facilitator 1108 generate a warning and/or error (1318). If the selected input does not violate the rules, control proceeds to 1320. The rules applier 1104 determines if there is another output of the selected trading block to be checked (1320). If there is another output of the selected trading block to be checked (1320), control returns to 1314. If there is not another output of the selected trading block to be checked (1320), control proceeds to 1322. The rules applier 1104 determines if there is another trading block within the trading algorithm to be checked for rules compliance (1322). If there is another trading block to be checked (1322), control returns to 1302. If there is not another trading block within the trading algorithm to be checked for rules compliance (1322), the example method 1300 ends.

Figure 14:
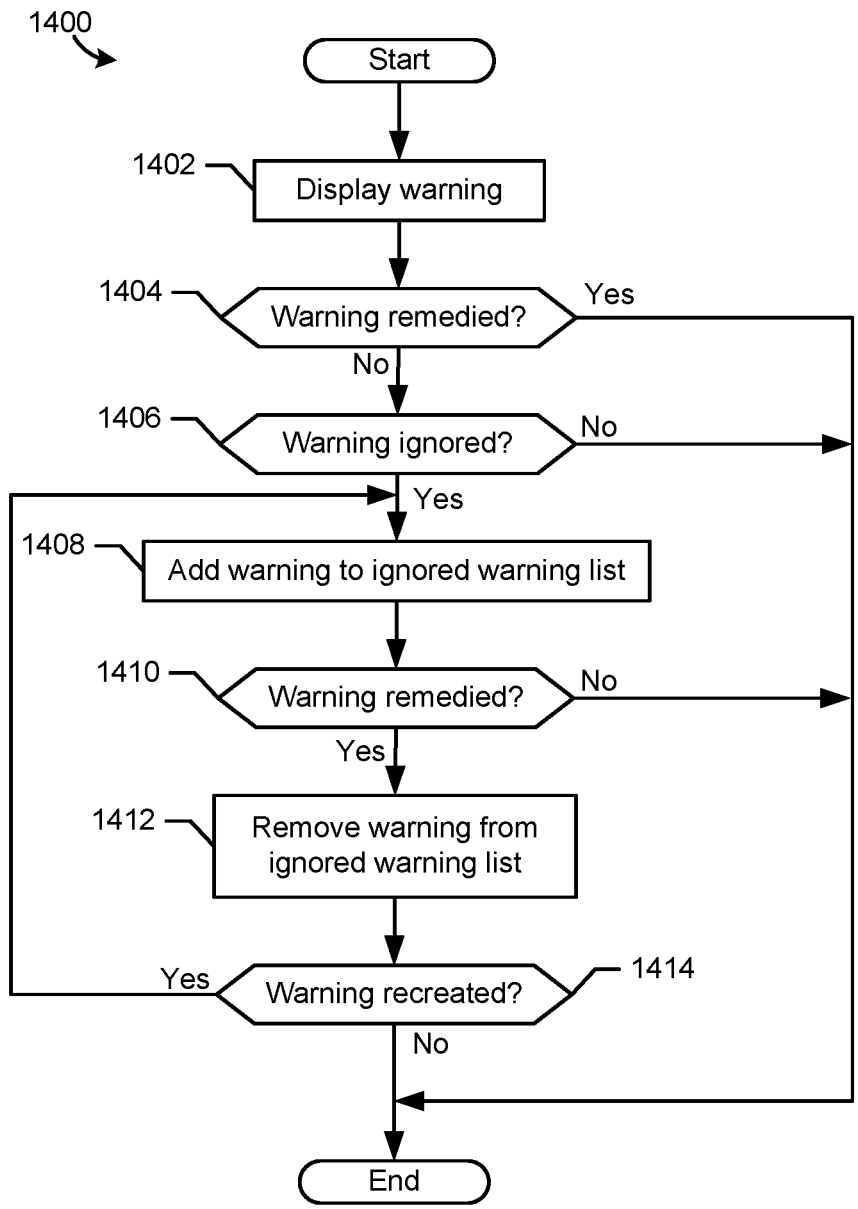
FIG. 14 illustrates a flow diagram of another example method for managing warnings and errors in an electronic trading system.

FIG. 14 is a flow diagram of an example method 1400 to track warnings associated with trading algorithms. The warning facilitator 1106 causes a warning to be displayed to a user at a trading device (e.g., the trading device 110) (1402). The warning facilitator 1106 determines if the warning is remedied (1404). The warning is remedied if, for example, the trading algorithm is altered such that the rule associated with the warning is no longer violated. If the warning is remedied (1404), the example method 1400 ends. If the warning is not remedied (1404), the warning facilitator 1106 determines if the warning is actively ignored by the user (1406). In certain embodiments, a warning may be ignored by a user at the trading device 110 (e.g., the user may select an ignore button that removes the warning from display). If the warning is not ignored (1406), the example method 1400 ends. If the warning is ignored (1406), the warning facilitator 1106 adds the warning to an ignored warnings list (1408). The ignored warnings list may include the warning and a unique identifier of the trading blocks producing the warning. The warning facilitator 1106 determines if the ignored warning is remedied (1410). If the ignored warning is not remedied (1410), the example method 1400 ends. If the ignored warning is remedied (1410), the warning facilitator 1106 removes the ignored warning from the ignored warnings list (1412). The warning facilitator 1106 determines if the warning is recreated (1414). For example, the warning facilitator 1106 determines if the trading blocks are arranged as to violate the rule associated with the warning again. If the warning is not recreated (1414), the example method 1400 ends. If the warning is recreated (1414), control returns to 1408.

Some of the described figures depict example block diagrams, systems and/or flow diagrams representative of methods that may be used to implement all or part of certain embodiments. One or more of the components, elements, blocks, and/or functionality of the example block diagrams, systems, and/or flow diagrams may be implemented alone or in combination in hardware, firmware, discrete logic, as a set of computer readable instructions stored on a tangible computer readable medium, or any combination thereof, for example.

The example block diagrams, systems, and/or flow diagrams may be implemented using any combination(s) of application specific integrated circuit(s) ("ASIC"(s)), programmable logic device(s) ("PLD"(s)), field programmable logic device(s) ("FPLD"(s)), discrete logic, hardware, and/or firmware, for example. Also, some or all of the example methods may be implemented manually or in combination with the foregoing techniques, for example.

The example block diagrams, systems, and/or flow diagrams may be performed using one or more processors, controllers, and/or other processing devices, for example. For example, the examples may be implemented using coded instructions, for example, computer readable instructions, stored on a tangible computer readable medium. A tangible computer readable medium may include various types of volatile and non-volatile storage media, including, for example, random access memory ("RAM"), read-only memory ("ROM"), programmable read-only memory ("PROM"), electrically programmable read-only memory ("EPROM"), electrically erasable read-only memory ("EEPROM"), flash memory, a hard disk drive, optical media, magnetic tape, a file server, any other tangible data storage device, or any combination thereof. The tangible computer readable medium is non-transitory. As used herein, the term non-transitory or tangible computer readable medium is expressly defined to include any type of computer readable storage media and to exclude propagating signals.

Further, although the example block diagrams, systems, and/or flow diagrams are described above with reference to the figures, other implementations may be employed. For example, the order of execution of the components, elements, blocks and/or other functionality may be changed, and/or some of the components, elements, blocks and/or other functionality described may be changed, eliminated, sub-divided, or combined. Additionally, any or all of the components, elements, blocks, and/or other functionality may be performed sequentially and/or in parallel by, for example, separate processing threads, processors, devices, discrete logic, and/or circuits.

While embodiments have been disclosed, various changes may be made and equivalents may be substituted. In addition, many modifications may be made to adapt a particular situation or material. Therefore, it is intended that the disclosed technology not be limited to the particular embodiments disclosed, but will include all embodiments falling within the scope of the appended claims.

What is claimed is:

1. A system including:
    a computing device,
    wherein the computing device is configured to display in a graphical user interface a design canvas area, wherein the design canvas area includes a plurality of placed blocks arranged by a user to specify a definition for a trading algorithm;
    wherein the computing device is configured to receive a change command from the user via the graphical user interface to change the arrangement of the plurality of placed blocks;
    wherein the computing device is configured to detect the change in the arrangement of the plurality of placed blocks, wherein the change in the arrangement of the plurality of placed blocks includes a change with respect to a changed block;
    wherein the computing device is configured to determine whether the trading algorithm complies with a trading algorithm rule based on the detected change in the arrangement of the plurality of placed blocks, wherein the trading algorithm rule defines a problem associated with a block type of the changed block;
    wherein the computing device is configured to display in the design canvas area of the graphical user interface a box around a portion of the plurality of placed blocks when the trading algorithm does not comply with the trading algorithm rule, wherein the portion of the plurality of placed blocks are the blocks that do not comply with the trading algorithm rule;
    wherein the computing device is configured to receive a selection command from the user via the graphical user interface selecting the displayed box; and
    wherein the computing device is configured to display, in response to receiving the selection command, in the design canvas area of the graphical user interface the box with an opaque background, wherein the opaque background is behind the portion of the plurality of placed blocks and obscures the remaining blocks in the plurality of placed blocks.

2. The system of claim 1, wherein the plurality of placed blocks are graphical representations of trading-related logic.

3. The system of claim 1, wherein each input and output of the changed block is checked for compliance with the trading algorithm rule.

4. The system of claim 1, wherein the computing device is configured to prevent the trading algorithm from executing when the trading algorithm does not comply with the trading algorithm rule.

5. The system of claim 1, wherein the computing device is configured to display information related to the trading algorithm rule and the changed block.

6. The system of claim 1, wherein the computing device is configured to receive an ignore command from the user via the graphical user interface and, in response to the ignore command, no longer displaying the box.

7. The system of claim 1, wherein the computing device is configured to log at least one of a user ignore or a user override of the determination that the trading algorithm does not comply with the trading algorithm rule.

8. The system of claim 1, wherein the change with respect to the changed block includes adding the changed block to the design canvas area.

9. The system of claim 1, wherein the change with respect to the changed block includes removing the changed block from the design canvas area.

10. The system of claim 1, wherein the change with respect to the changed block includes a change to a configuration of the changed block.

11. The system of claim 1, wherein the change with respect to the changed block includes a connection to an input of the changed block.

12. The system of claim 1, wherein the change with respect to the changed block includes a connection to an output of the changed block.

13. The system of claim 1, wherein the trading algorithm rule defines a logic-based problem.

14. The system of claim 13, wherein the logic-based problem is an infinite loop.

15. The system of claim 1, wherein the trading algorithm rule defines a trading-based problem.

16. The system of claim 15, wherein the trading-based problem is a connection that may result in an unintended trade.

17. The system of claim 1, wherein the trading algorithm rule defines a disallowed parameter for a configuration of the changed block.

18. The system of claim 1, wherein the trading algorithm rule defines a disallowed connection for an input or an output of the changed block.

* * * * *